United States Patent
Jha et al.

(10) Patent No.: US 11,445,359 B2
(45) Date of Patent: Sep. 13, 2022

(54) APPARATUS AND METHOD FOR PROVIDING VOICE CALL AND DATA SERVICE SIMULTANEOUSLY ON PLURALITY OF SIM

(71) Applicant: Samsung Electronics Co., Ltd., Suwon-si (KR)

(72) Inventors: Kailash Kumar Jha, Bangalore (IN); Alok Kumar Jangid, Bangalore (IN); Aman Agarwal, Bangalore (IN); Govind Irappa Uttur, Bangalore (IN); Mudit Goel, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/272,263

(22) PCT Filed: Aug. 27, 2019

(86) PCT No.: PCT/KR2019/010920
§ 371 (c)(1),
(2) Date: Feb. 26, 2021

(87) PCT Pub. No.: WO2020/045952
PCT Pub. Date: Mar. 5, 2020

(65) Prior Publication Data
US 2021/0227376 A1    Jul. 22, 2021

(30) Foreign Application Priority Data

Aug. 27, 2018 (IN) .............................. 201841031991
Aug. 23, 2019 (IN) .............................. 201841031991

(51) Int. Cl.
*H04W 28/04* (2009.01)
*H04W 76/16* (2018.01)
(Continued)

(52) U.S. Cl.
CPC ......... *H04W 8/183* (2013.01); *H04W 60/005* (2013.01); *H04W 60/04* (2013.01);
(Continued)

(58) Field of Classification Search
None
See application file for complete search history.

(56) References Cited

U.S. PATENT DOCUMENTS 9,538,579 B2    1/2017  Song et al.
9,674,758 B2    6/2017  Tsai et al.
(Continued)

FOREIGN PATENT DOCUMENTS

EP    3 053 364 B1    10/2017
EP    3 340 732 A1    6/2018
WO    2018/031846 A1    2/2018

OTHER PUBLICATIONS

Office Action dated Oct. 8, 2021 in connection with India Patent Application No. 201841031991, 5 pages.
(Continued)

*Primary Examiner* — Gary Lafontant

(57) ABSTRACT

The present disclosure relates to a pre-$5^{th}$-Generation (5G) or 5G communication system to be provided for supporting higher data rates Beyond $4^{th}$-Generation (4G) communication system such as long term evolution (LTE). Embodiments herein provide a method for providing voice call and data service simultaneously on plurality of SIM in EN-DC capable UE. The method includes registering a first SIM to a first network in a DCNR supported mode using a T1 and registering a second SIM to a second network in the DCNR not supported mode using a T2. The method also includes determining a 4G bearer is established on the T1 and a 5G bearer is established on the T2 by the first network using the first SIM. Further, the method also includes determining the voice call is being initiated on the second
(Continued)

SIM when the data service is active on the first SIM through the T1 and the T2; and configuring the second SIM to provide the voice call over the T2 and the first SIM to provide the data services over the T1.

20 Claims, 23 Drawing Sheets

(51) Int. Cl.
   *H04W 8/18*    (2009.01)
   *H04W 76/27*   (2018.01)
   *H04W 60/00*   (2009.01)
   *H04W 60/04*   (2009.01)
   *H04W 88/06*   (2009.01)

(52) U.S. Cl.
   CPC .......... *H04W 76/16* (2018.02); *H04W 76/27* (2018.02); *H04W 88/06* (2013.01)

(56) References Cited

U.S. PATENT DOCUMENTS

| | | |
|---|---|---|
| 9,942,873 B2 | 4/2018 | Sebeni et al. |
| 2016/0014578 A1 | 1/2016 | Kadiyala et al. |
| 2016/0142998 A1 | 5/2016 | Tsai et al. |
| 2016/0337515 A1 | 11/2016 | Shi et al. |
| 2017/0280366 A1 | 9/2017 | Sahu et al. |
| 2018/0227960 A1 | 8/2018 | Belghoul et al. |
| 2019/0182762 A1* | 6/2019 | Mutikainen ............ H04W 76/16 |
| 2019/0268801 A1* | 8/2019 | Wang ...................... H04L 47/30 |

OTHER PUBLICATIONS

International Search Report dated Dec. 26, 2019 in connection with International Patent Application No. PCT/KR2019/010920, 3 pages.
Written Opinion of the International Searching Authority dated Dec. 26, 2019 in connection with International Patent Application No. PCT/KR2019/010920, 4 pages.

* cited by examiner

[Fig. 1A]
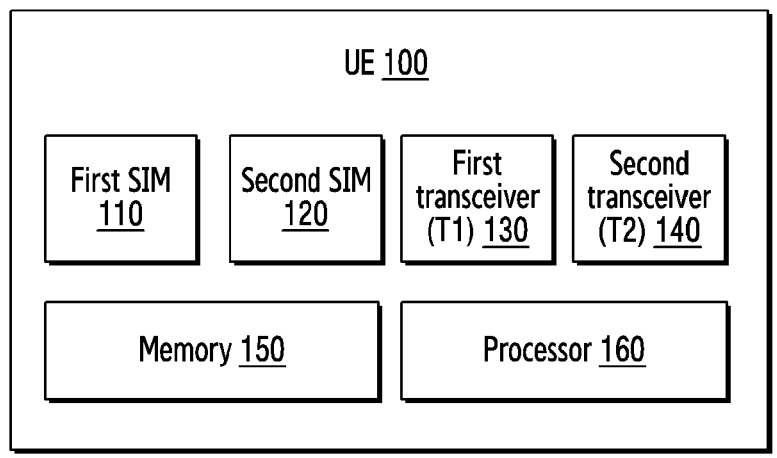
[Fig. 1B]
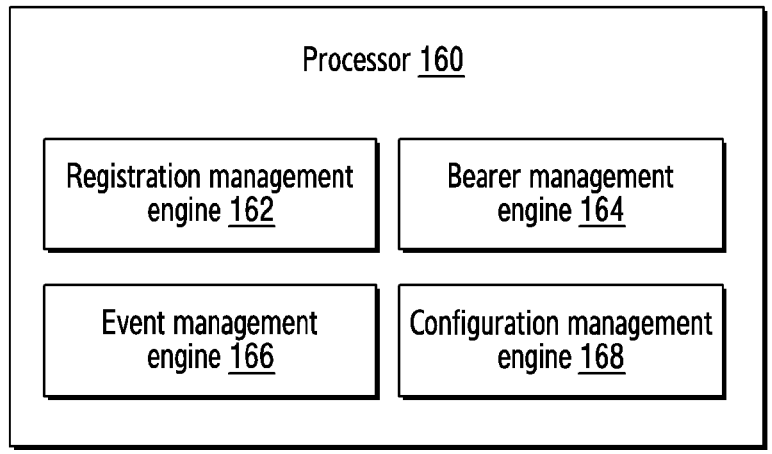

[Fig. 2A]
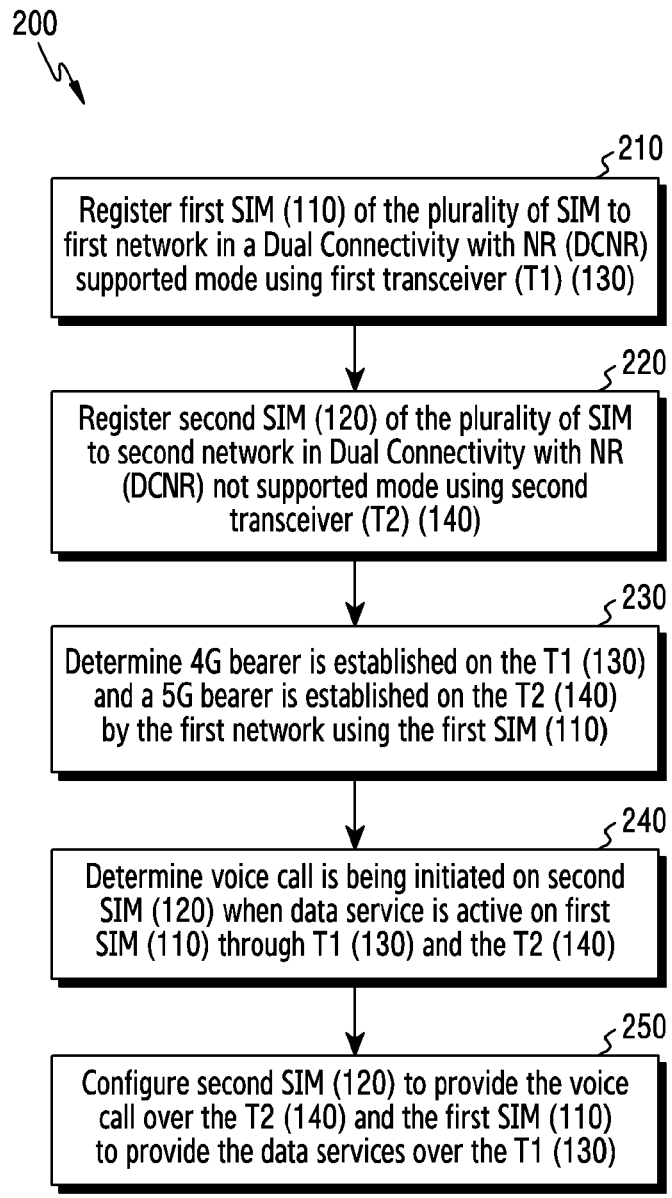

[Fig. 2B]
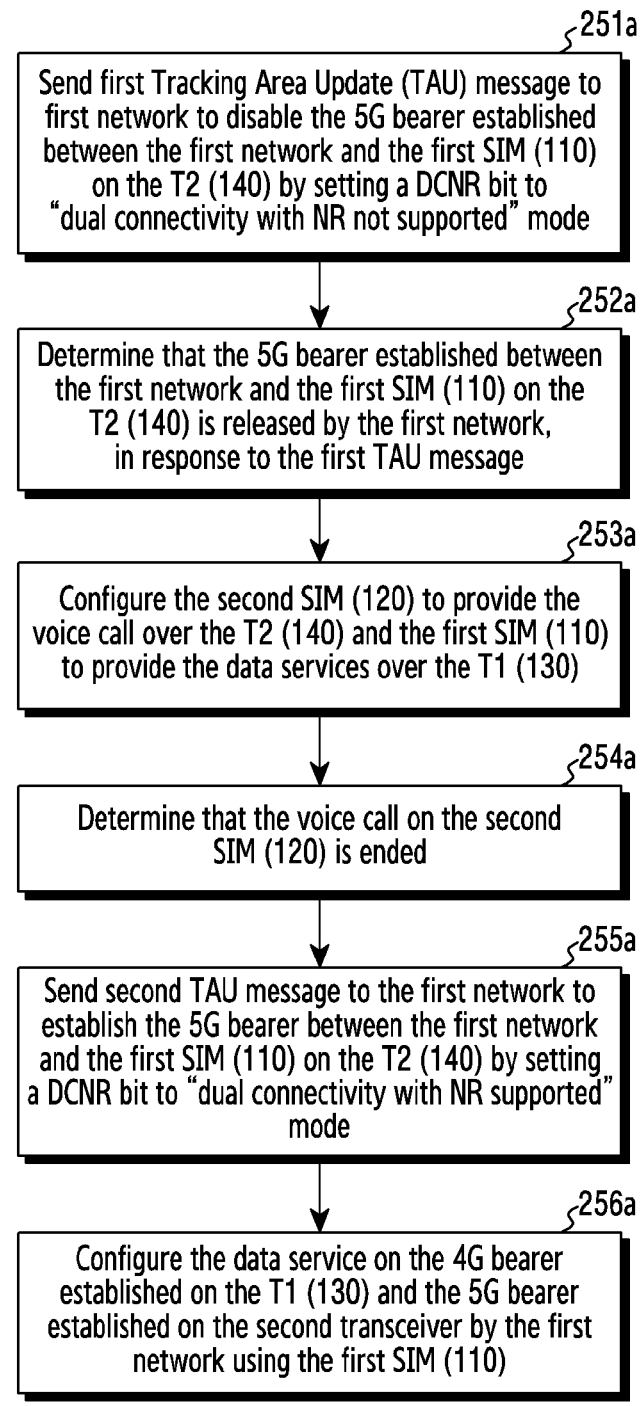

[Fig. 2C]
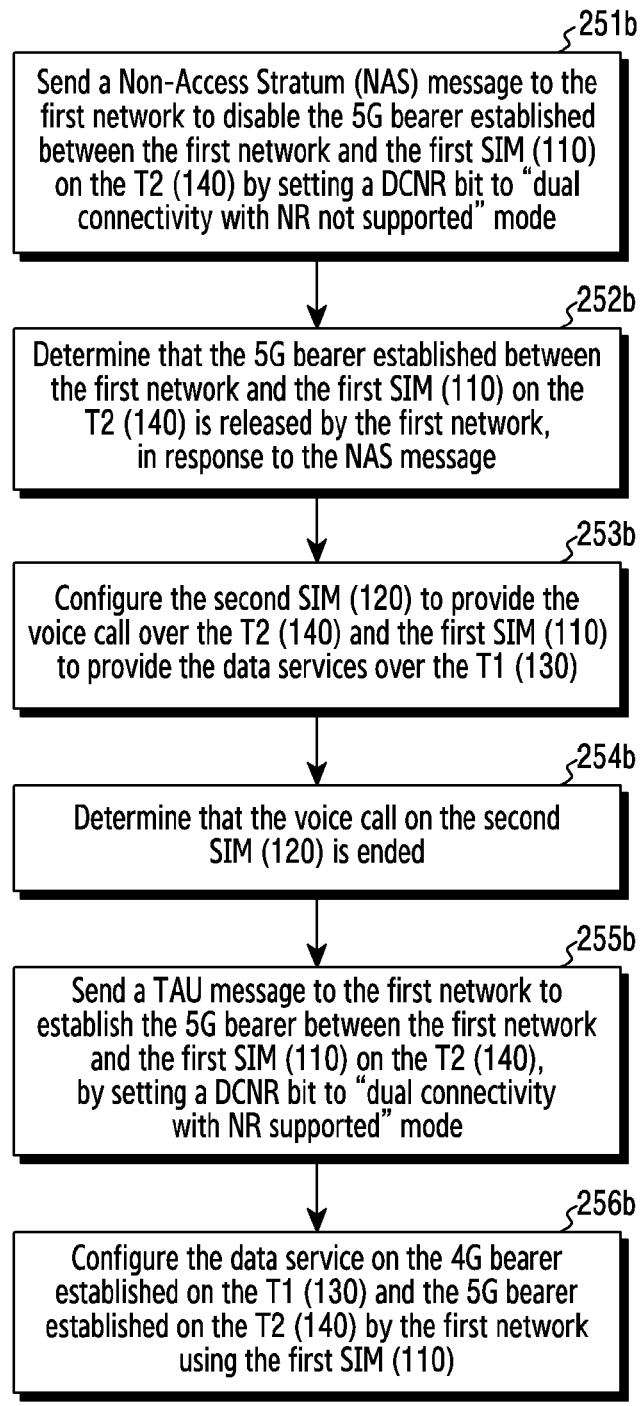

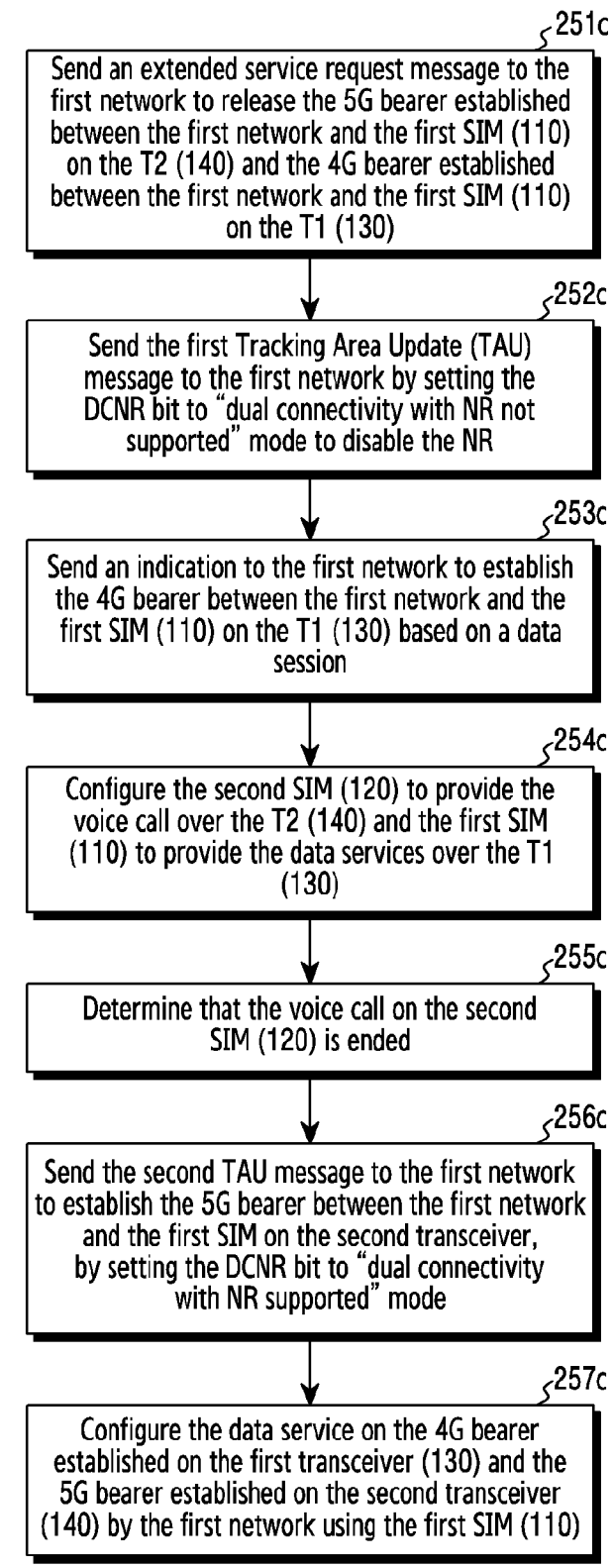

[Fig. 2E]
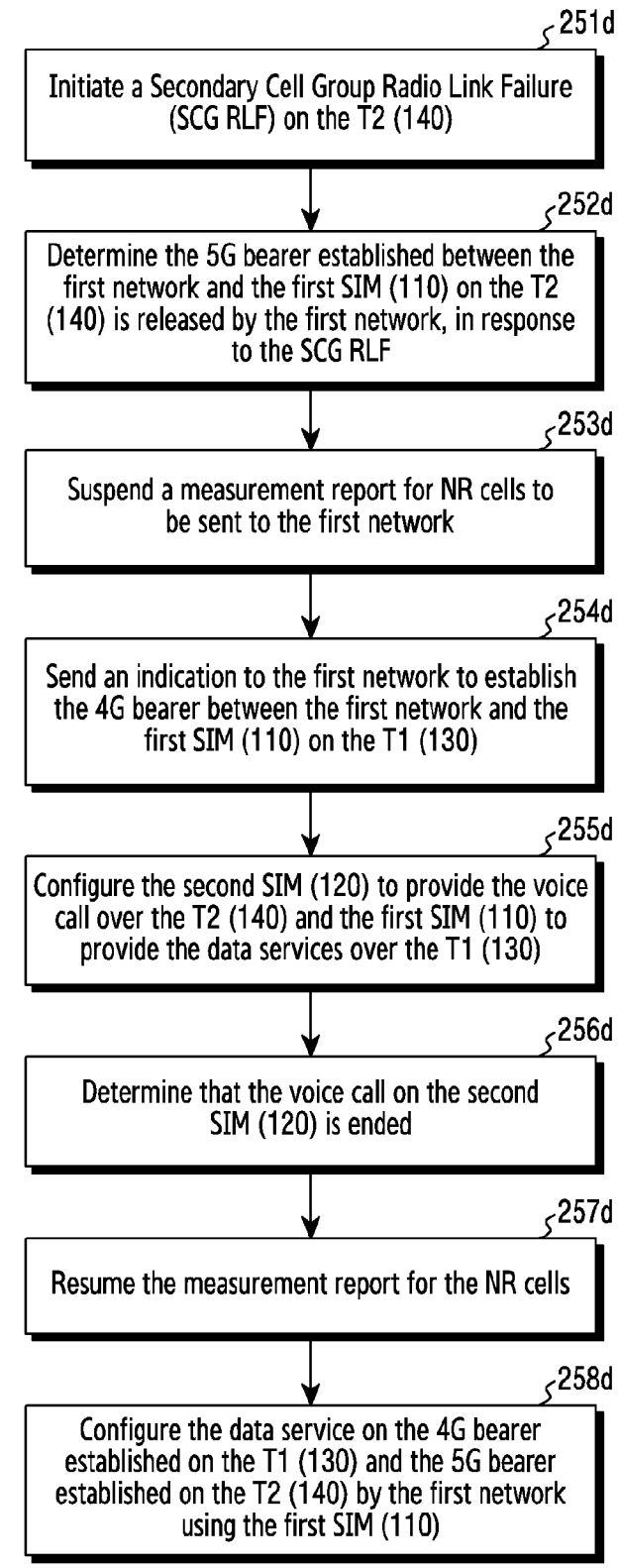

[Fig. 3]
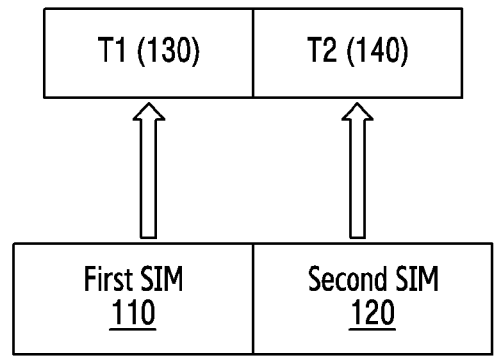
TRM Operation during for Dual SIM
| Dual SIM EN-DC capable UE (100) | | |
|---|---|---|
| Scenario | T1 (130) | T2 (140) |
| No Active Call | first SIM (110) | second SIM (120) |
| Split bearer on first SIM (110) | first SIM (110) | first SIM (110) |
| CS Call on first SIM (110) | CS Call (first SIM (110)) | second SIM (120) |
| Split bearer on first SIM (110) | second SIM (120) | second SIM (120) |

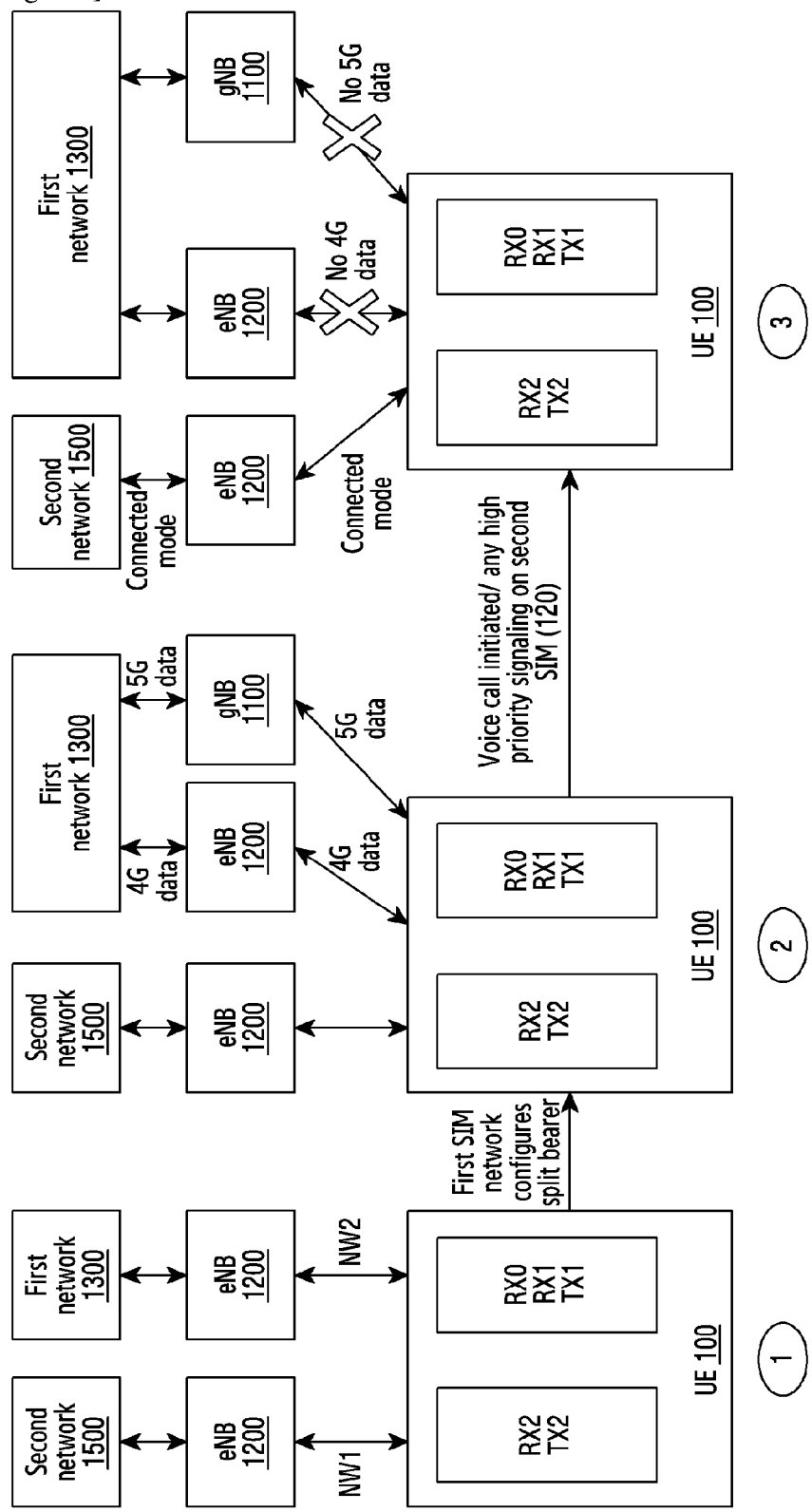
[Fig. 4A]

[Fig. 4B]
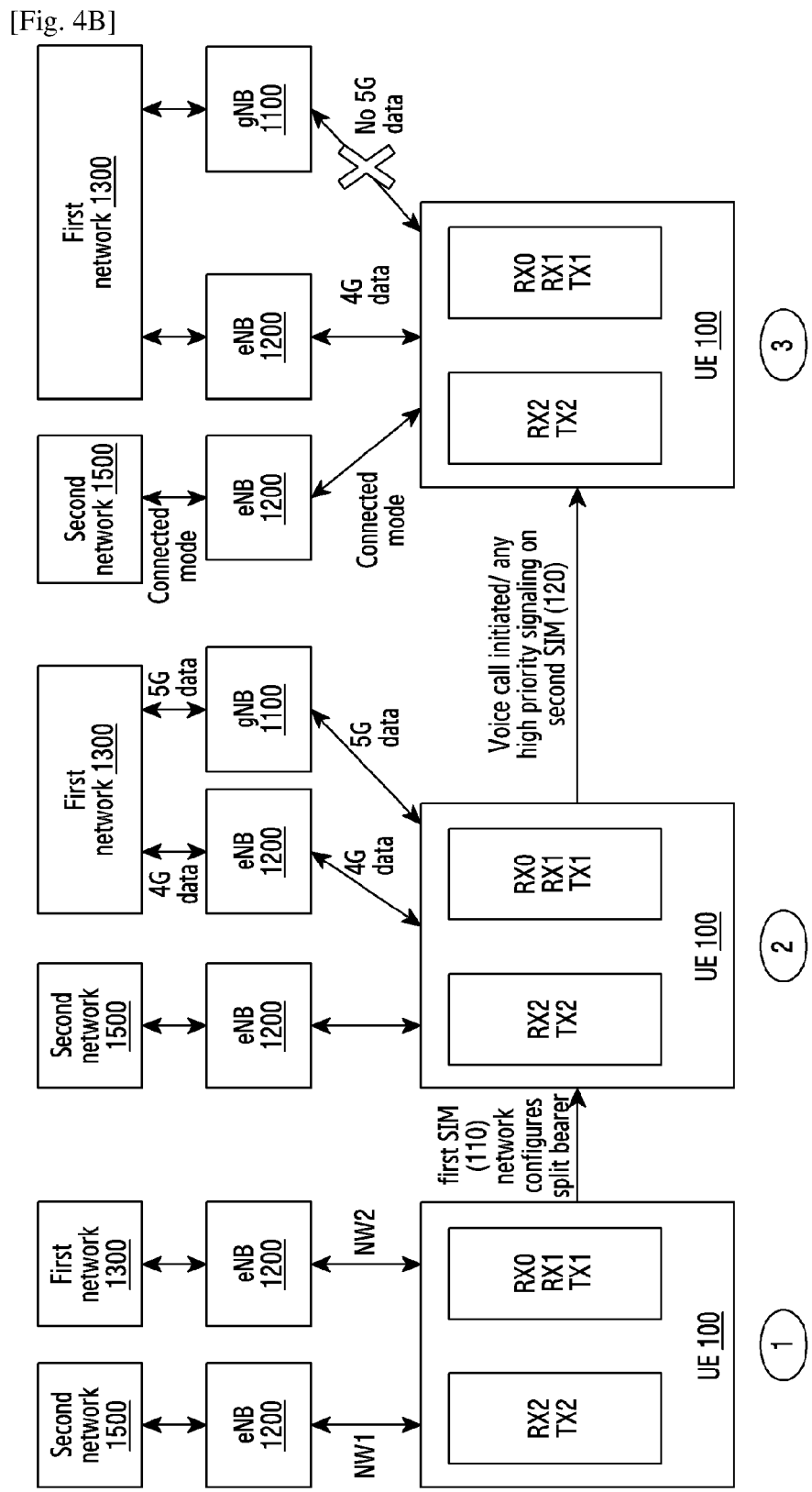

[Fig. 4C]
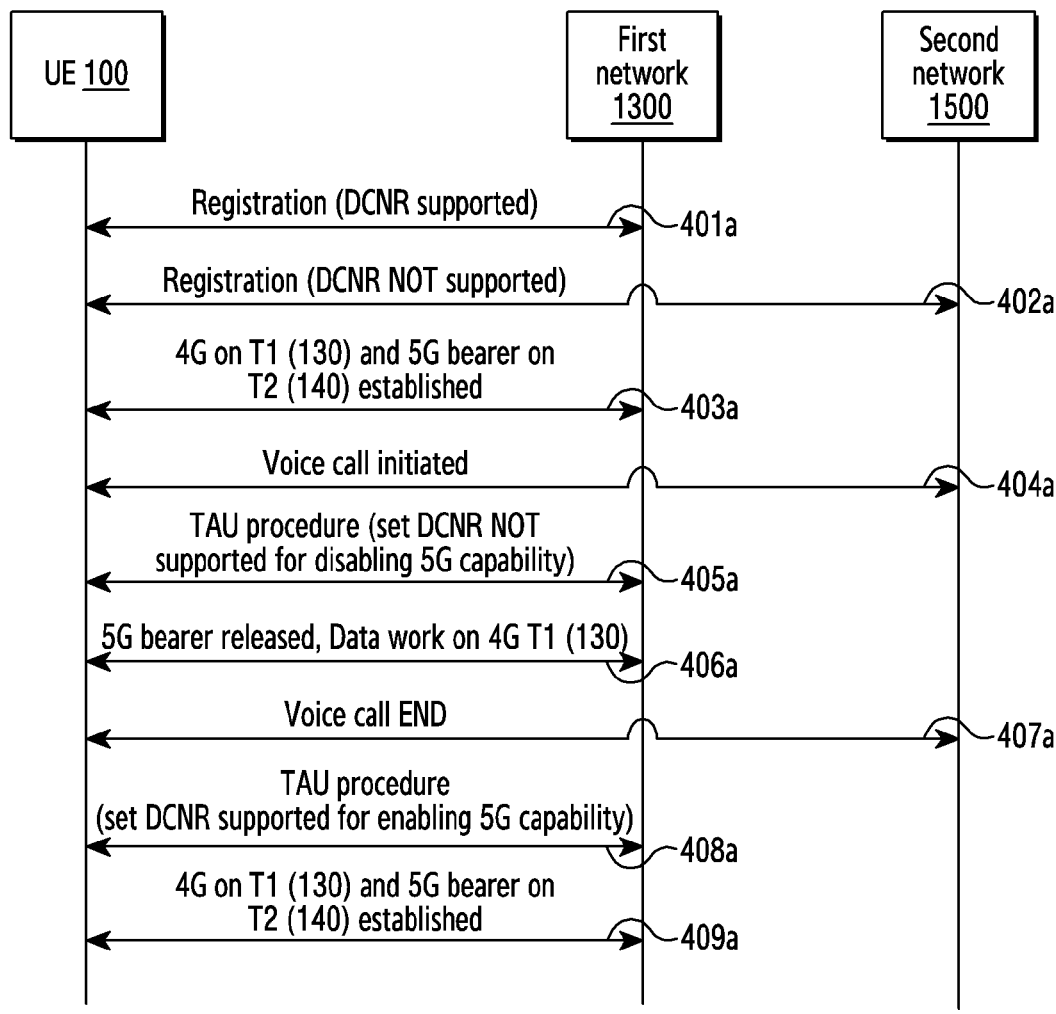

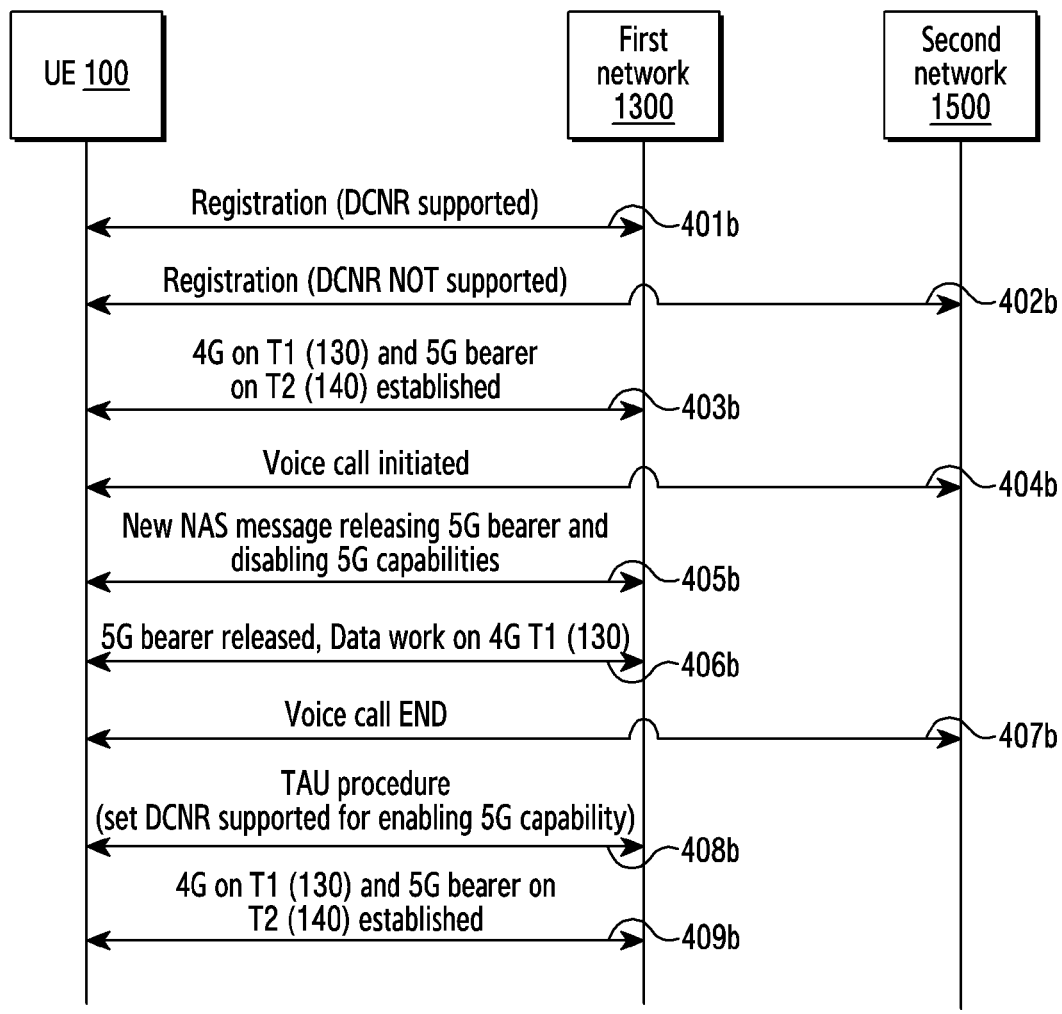
[Fig. 4D]

[Fig. 4E]
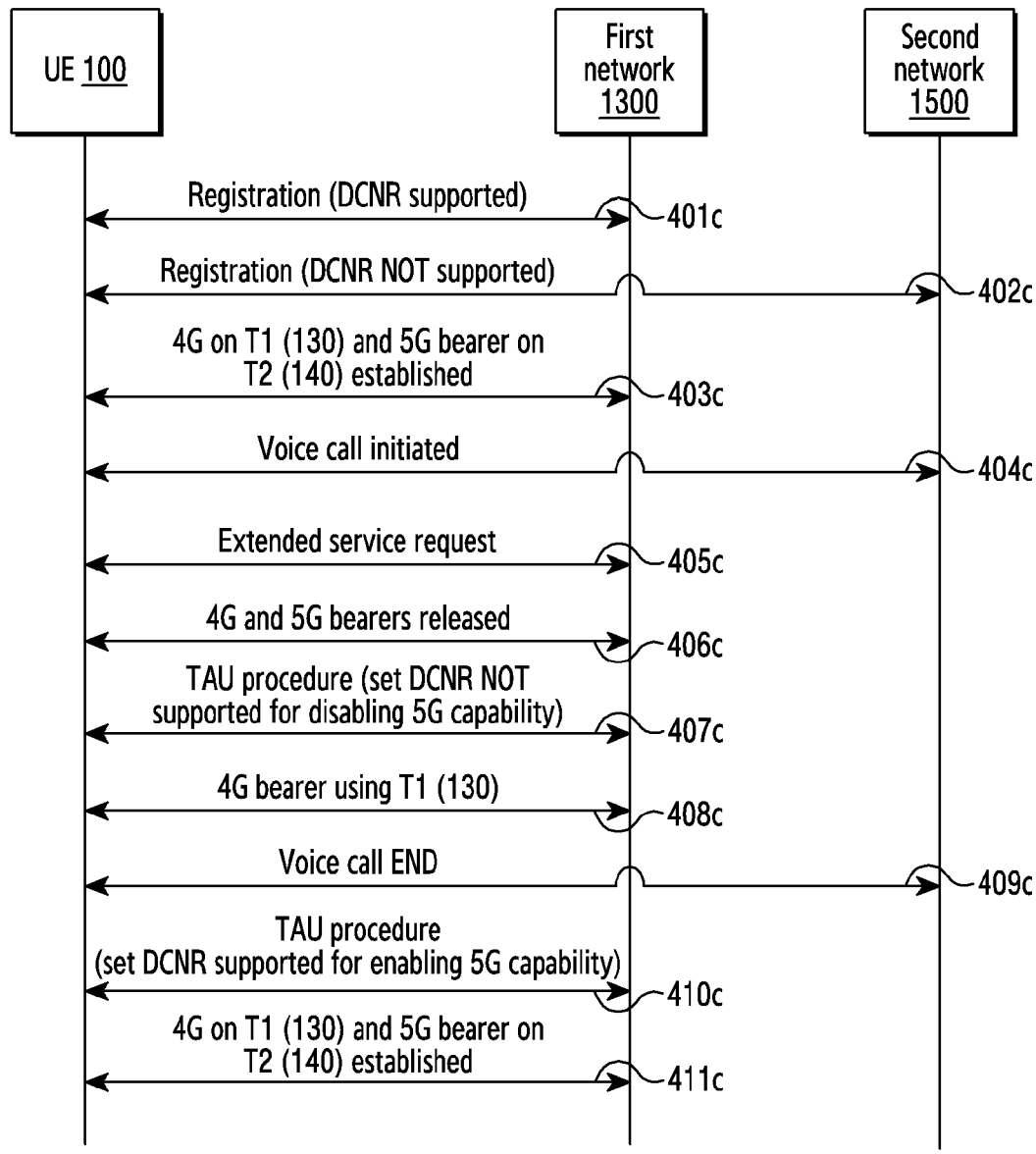

[Fig. 4F]
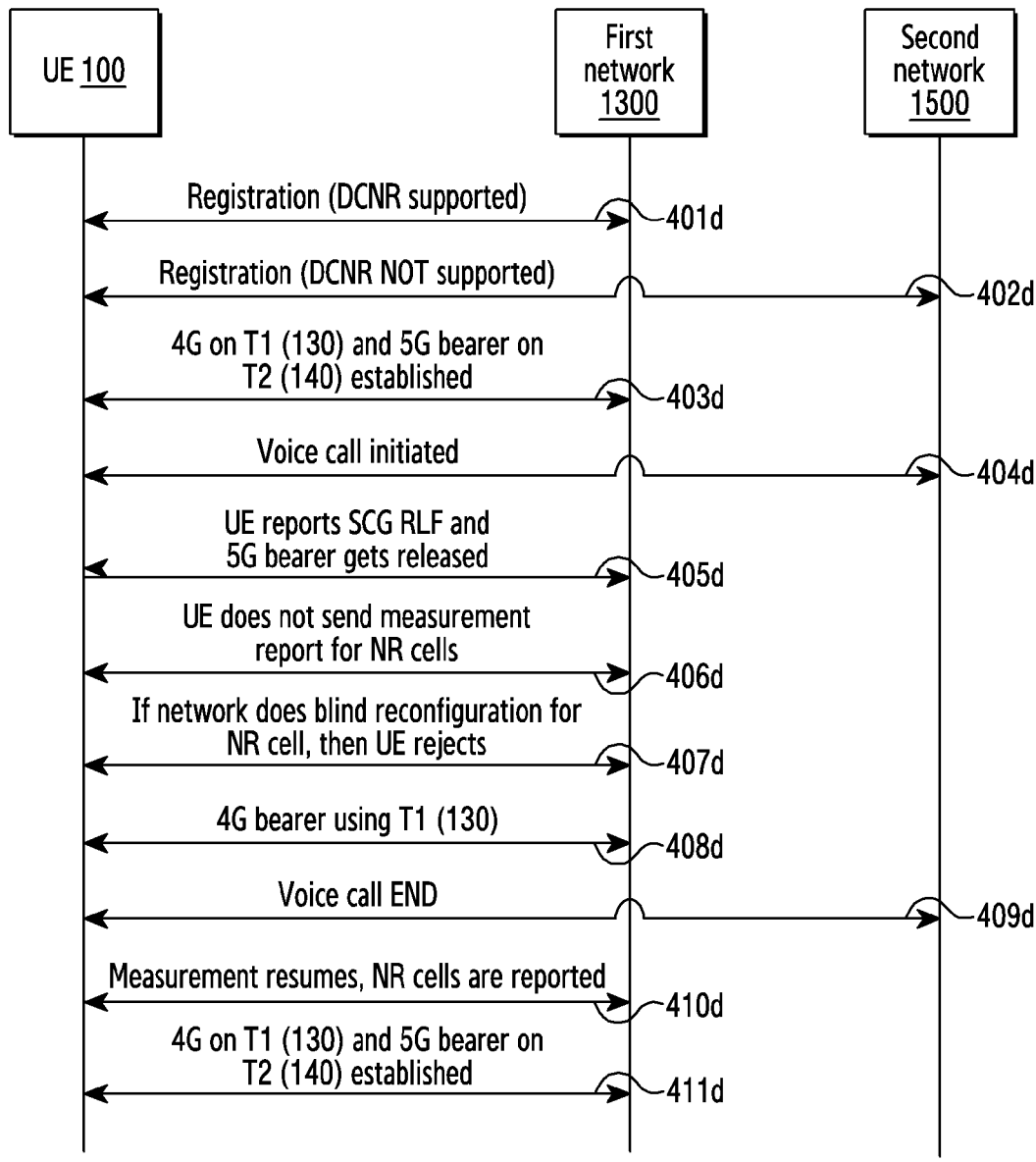

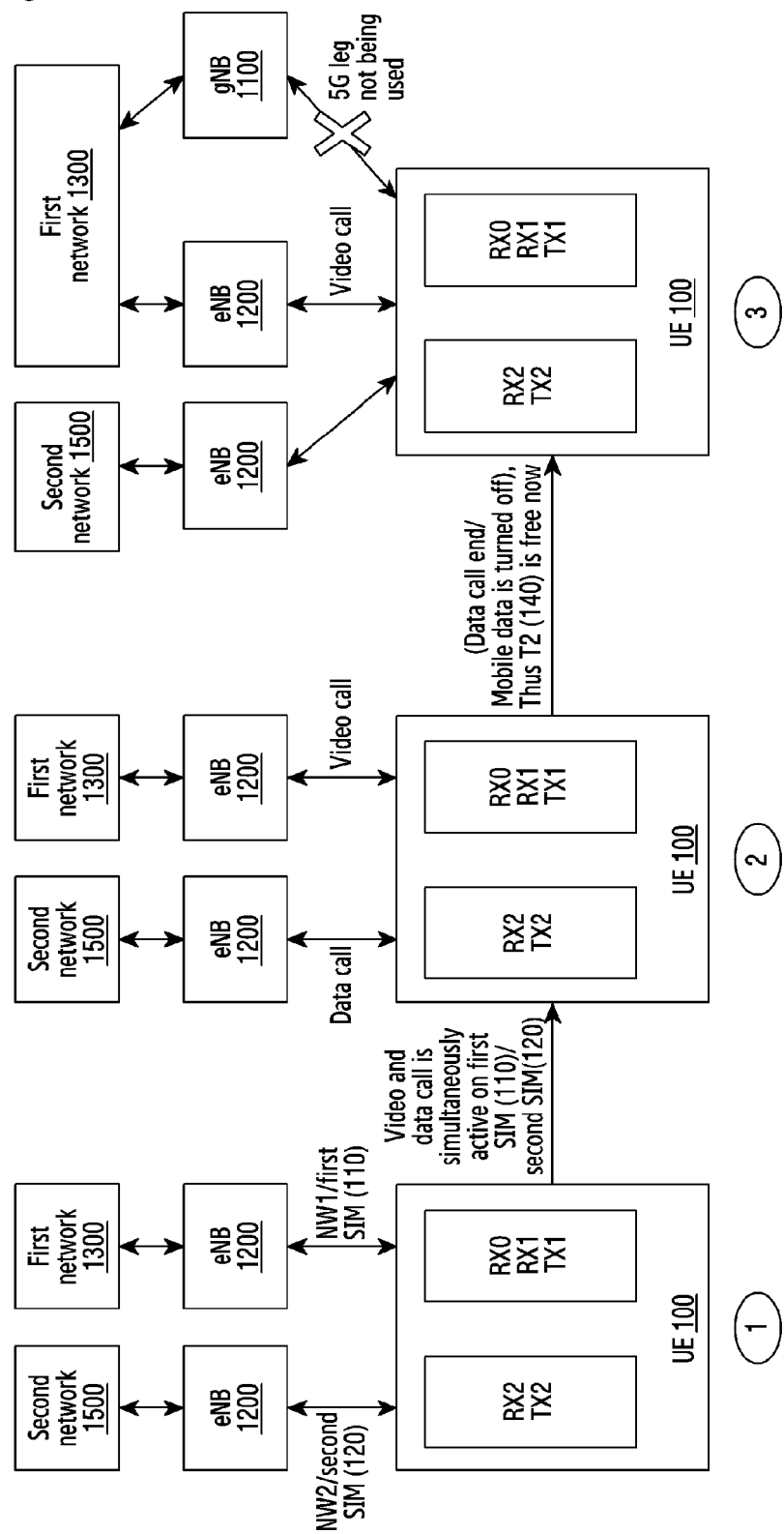
[Fig. 5A]

[Fig. 5B]
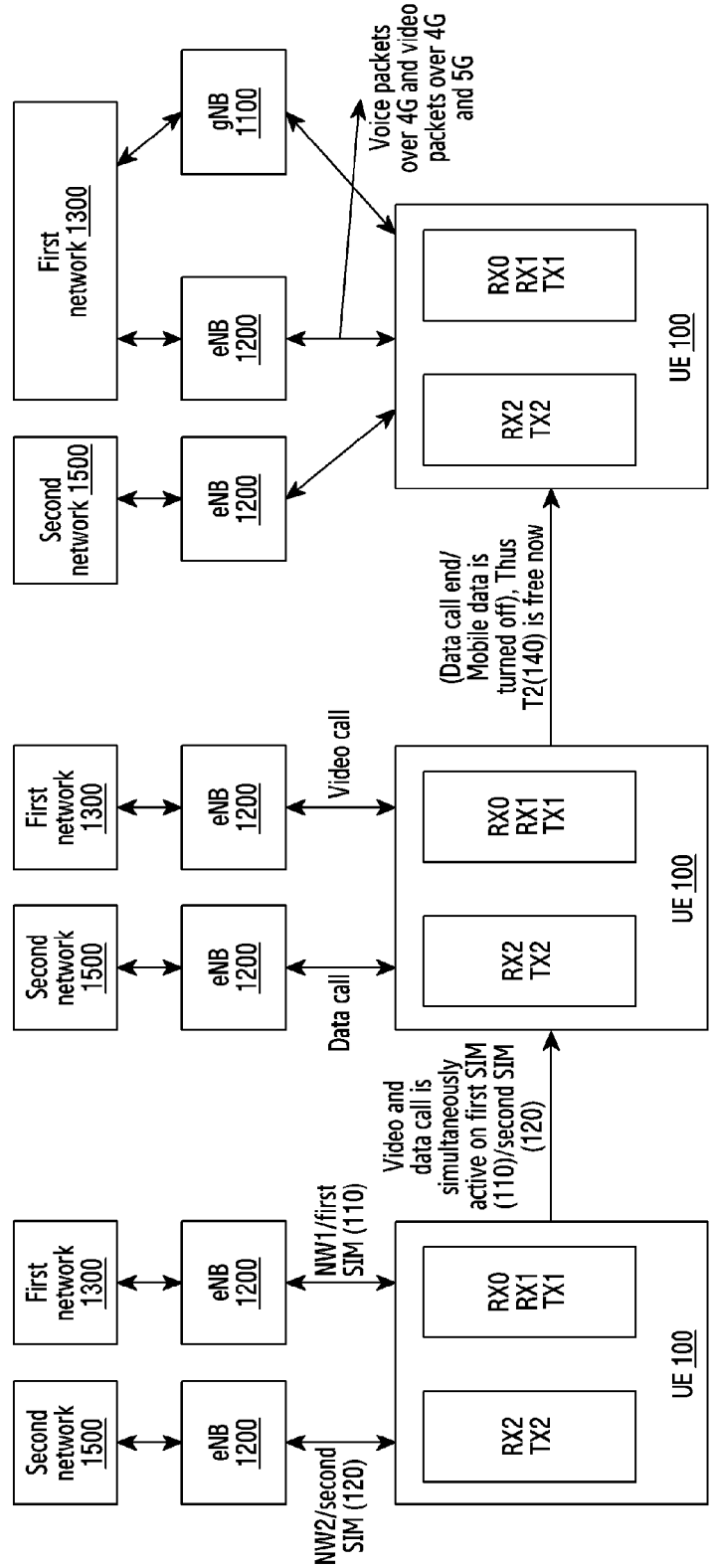

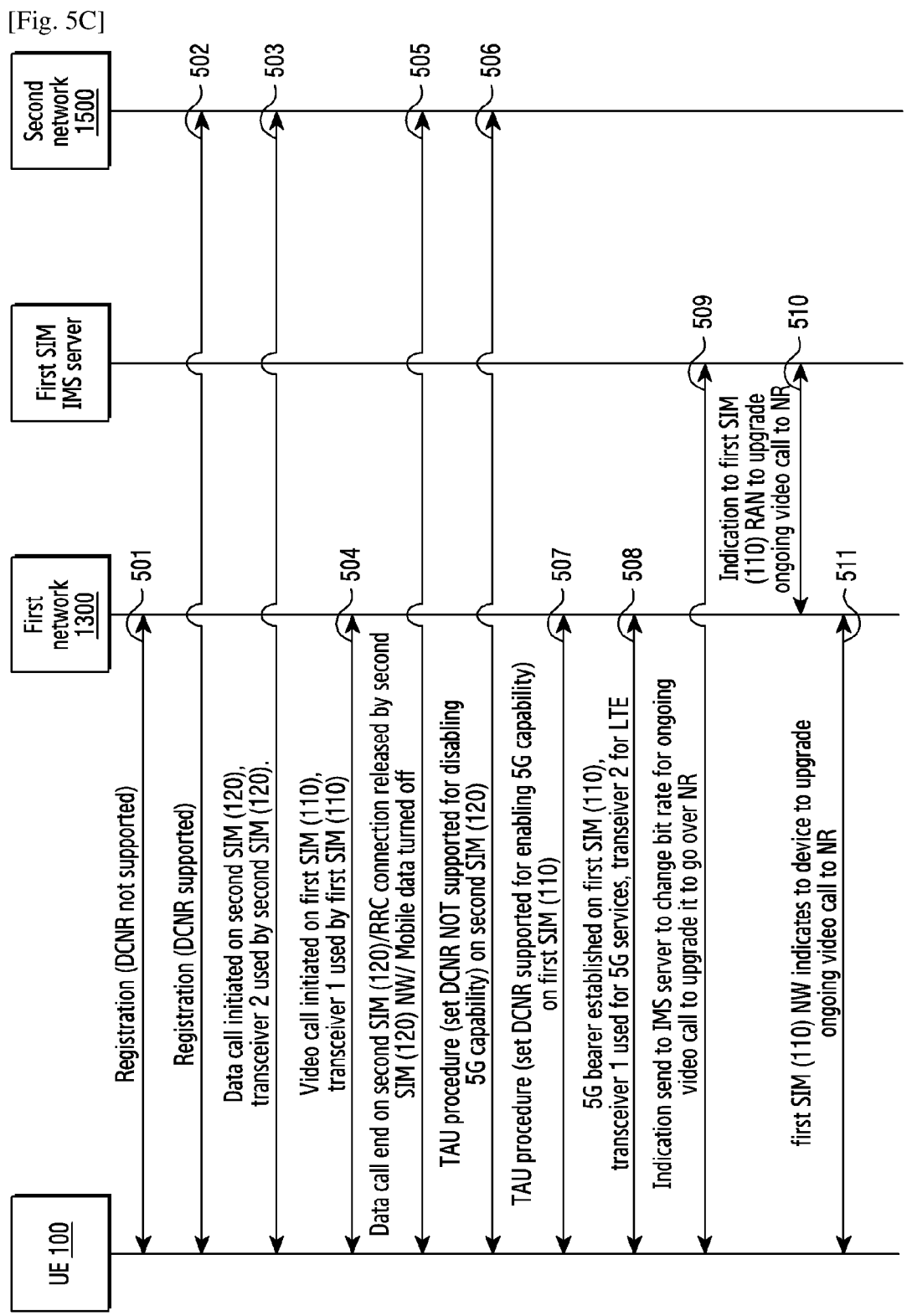
[Fig. 5C]

[Fig. 6A]
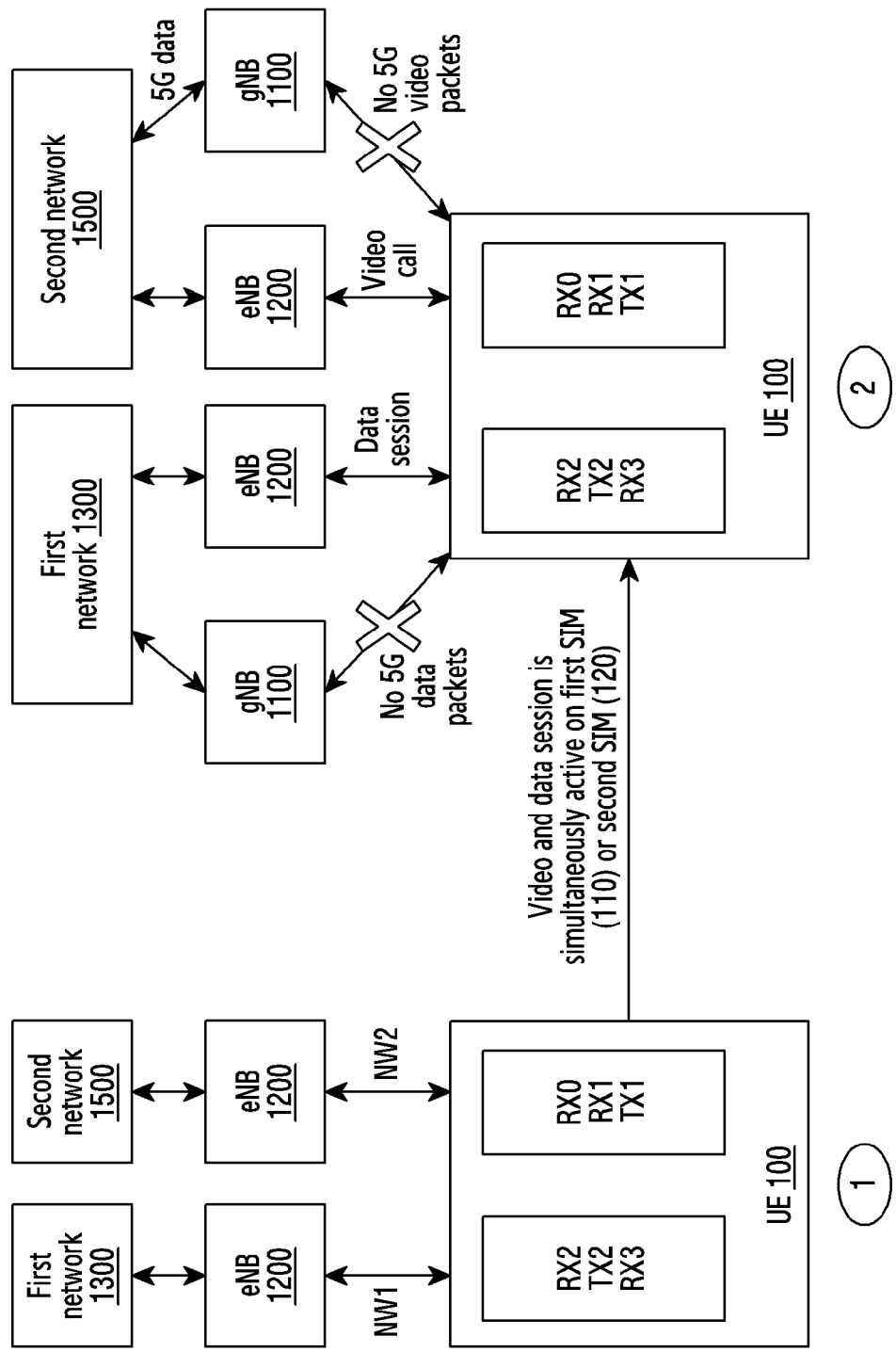

[Fig. 6B]
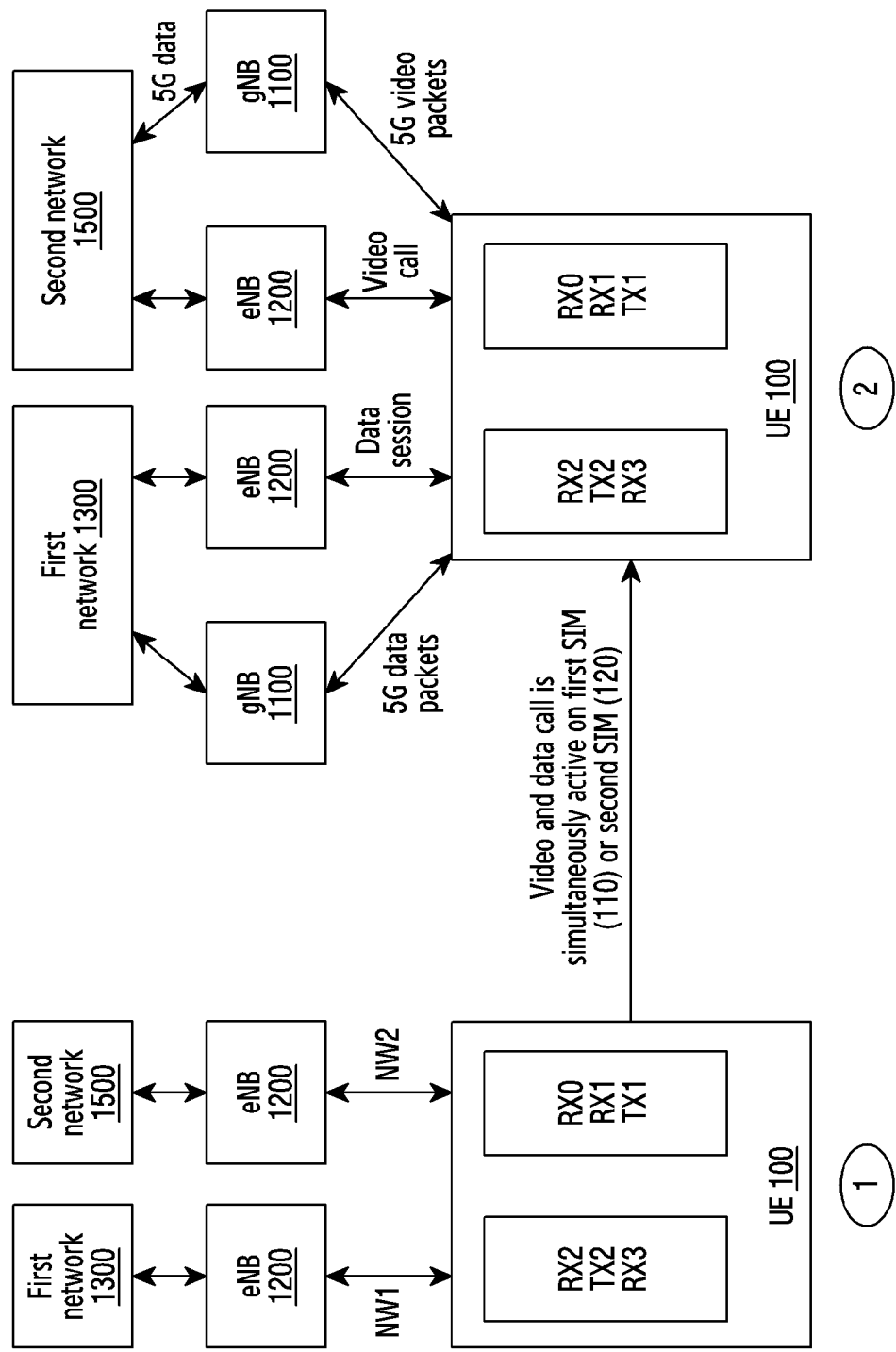

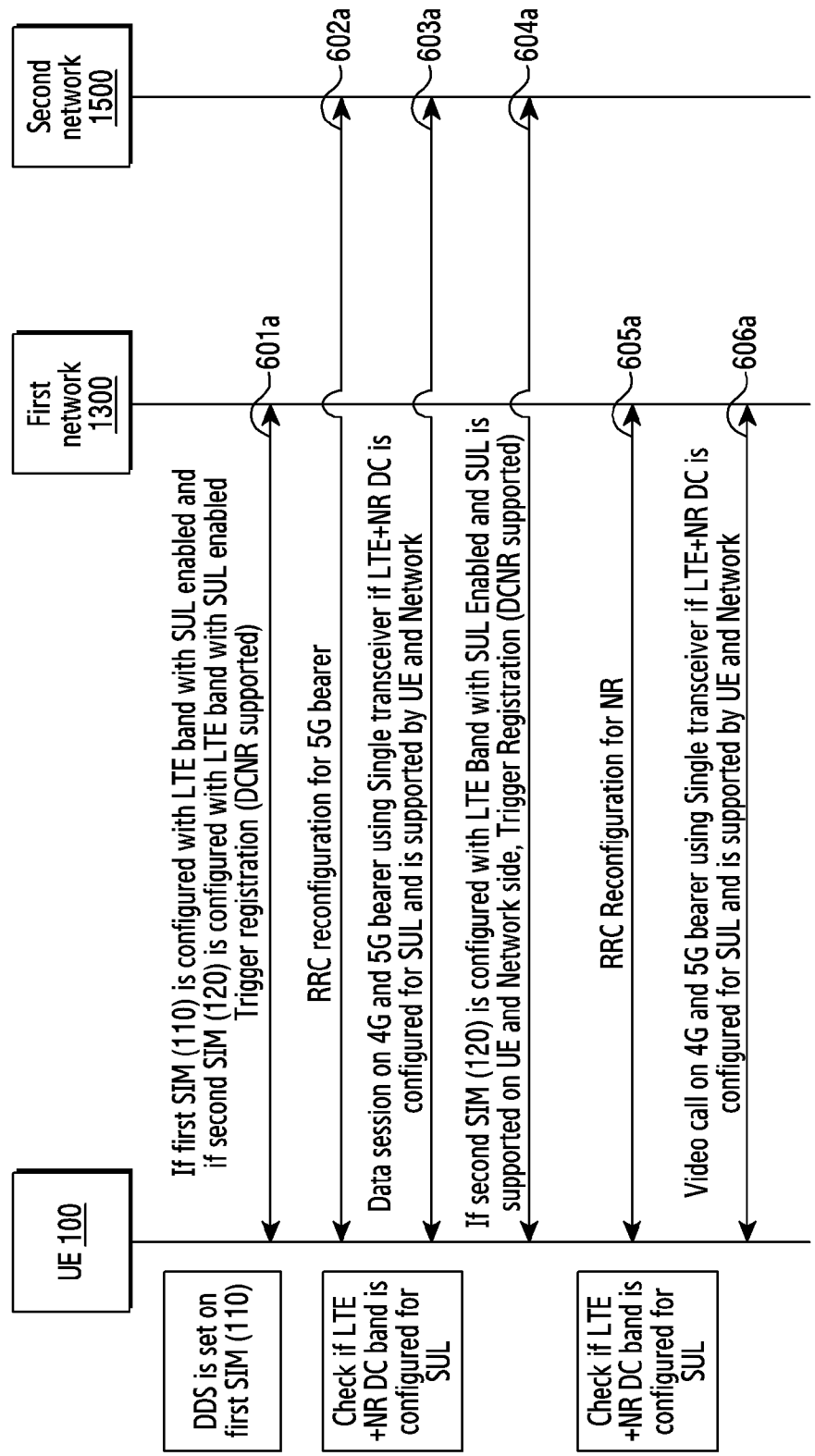
[Fig. 6C]

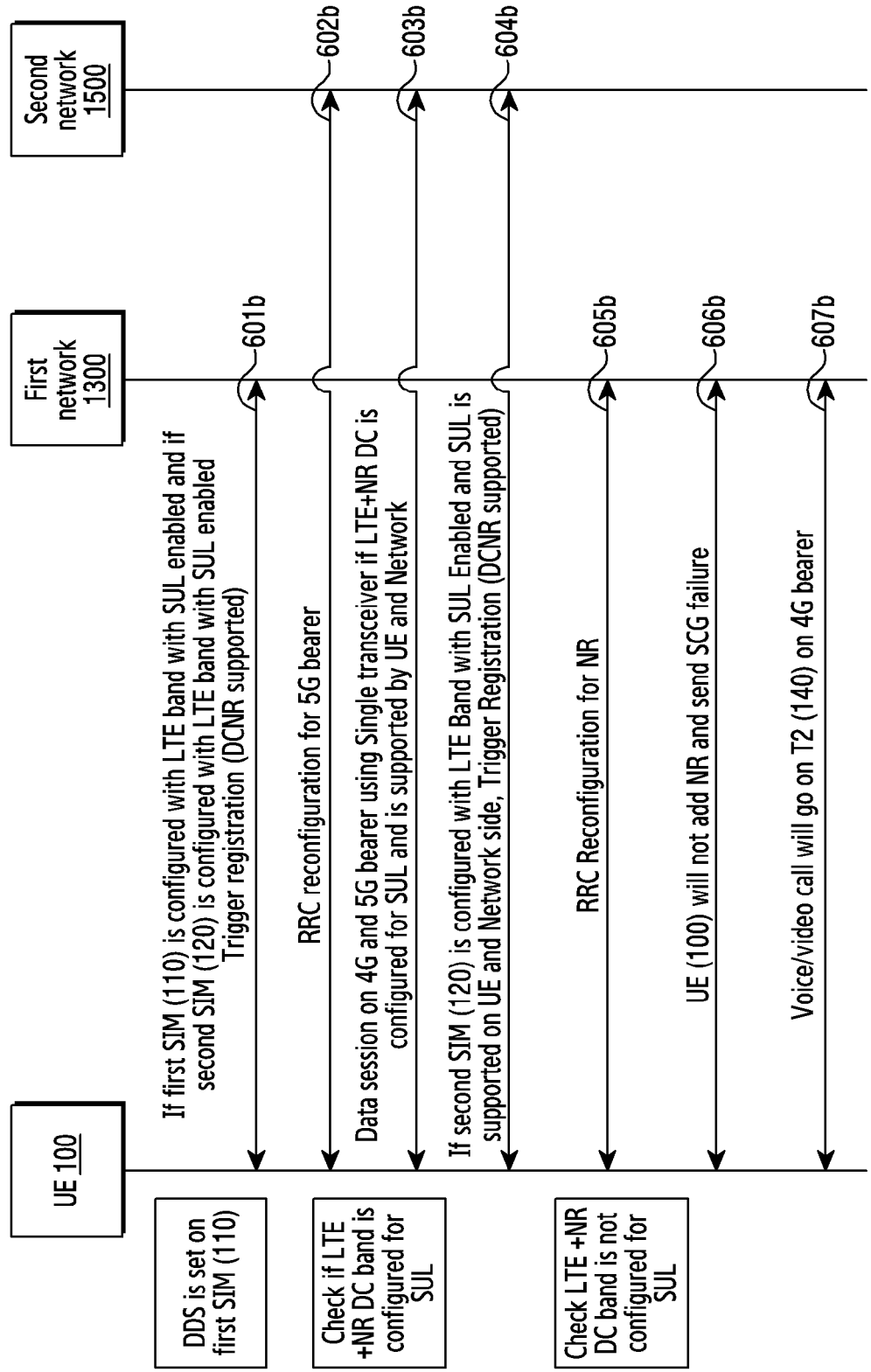
[Fig. 6D]

[Fig. 7A]
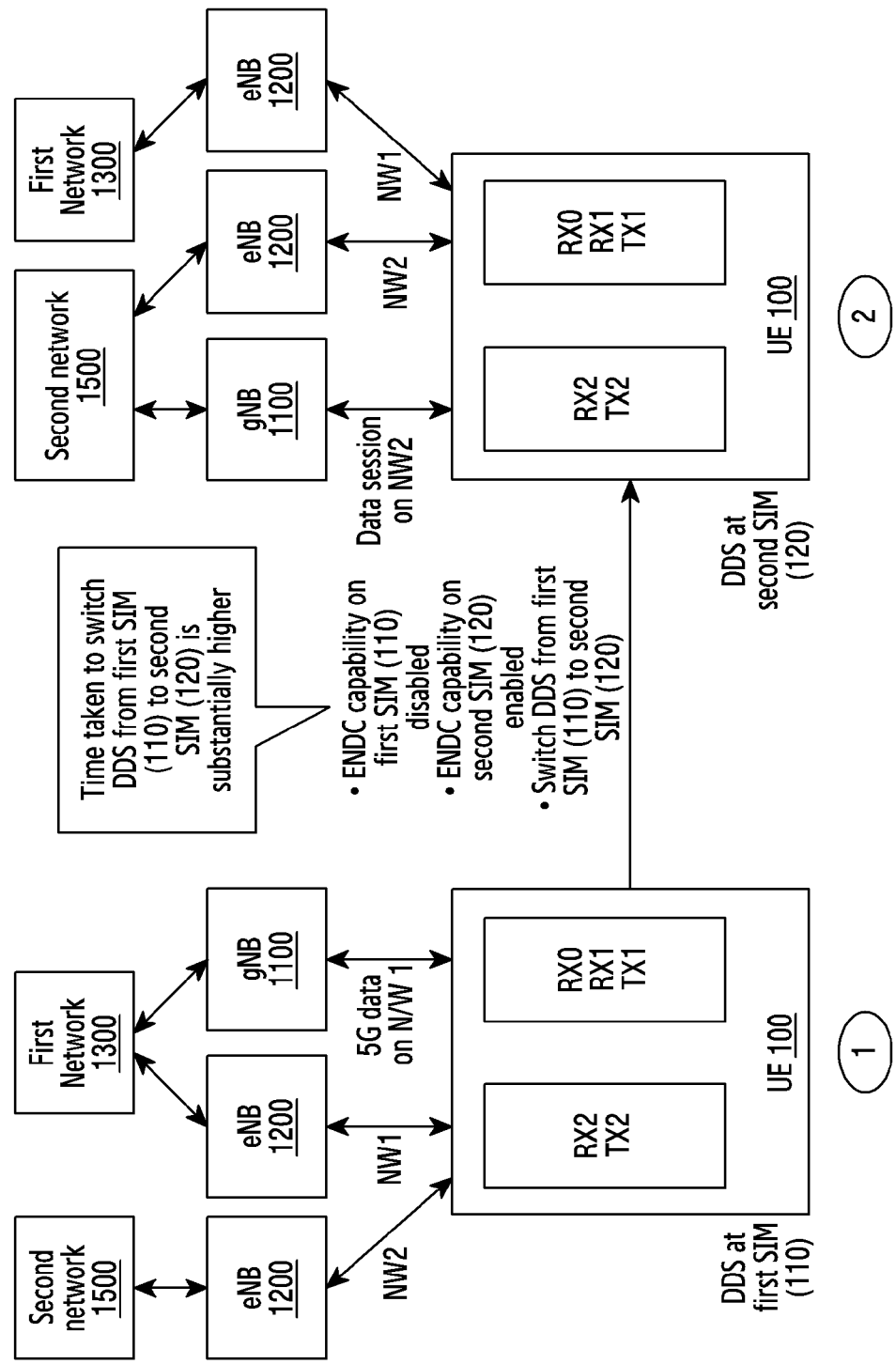

[Fig. 7B]
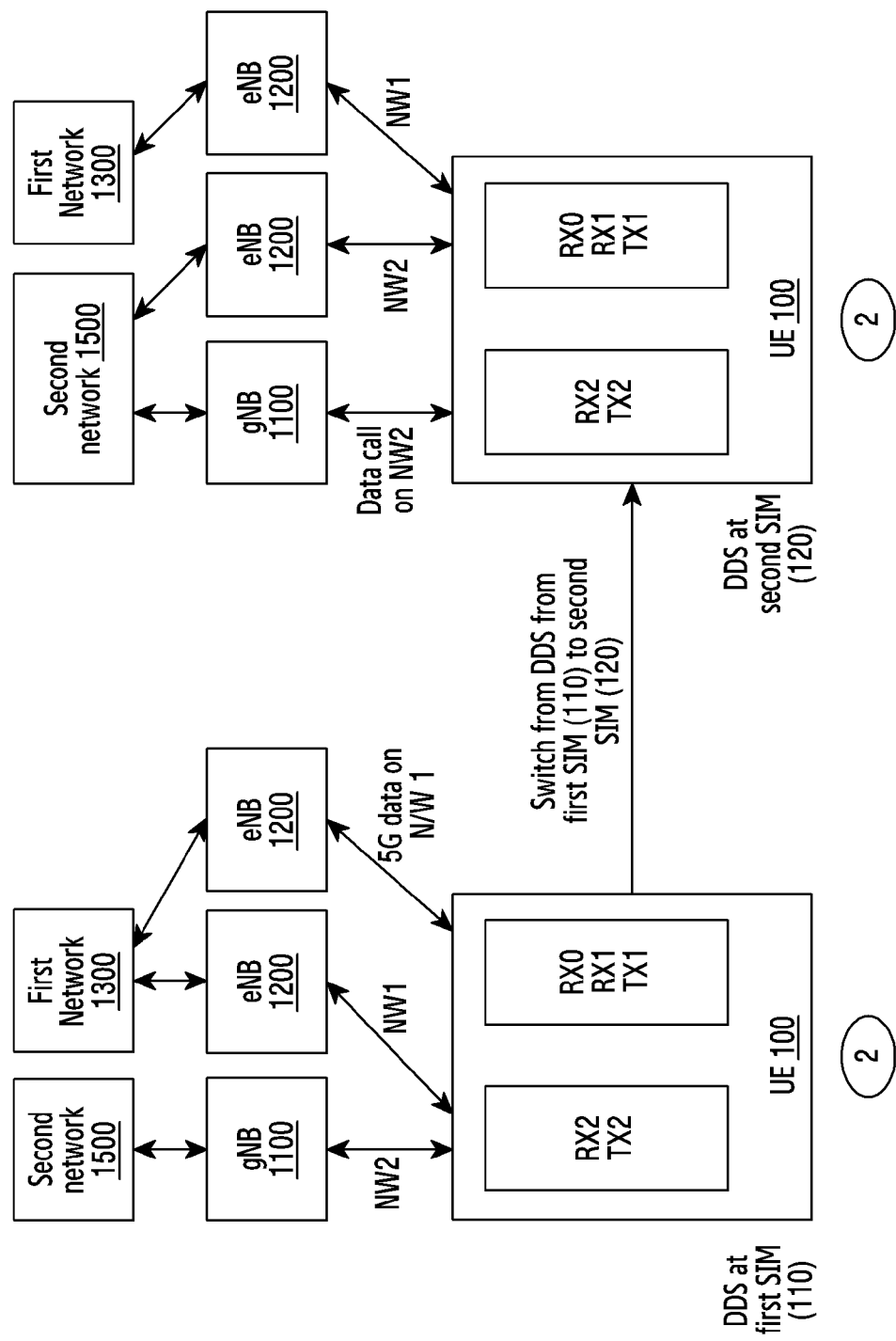

[Fig. 7C]
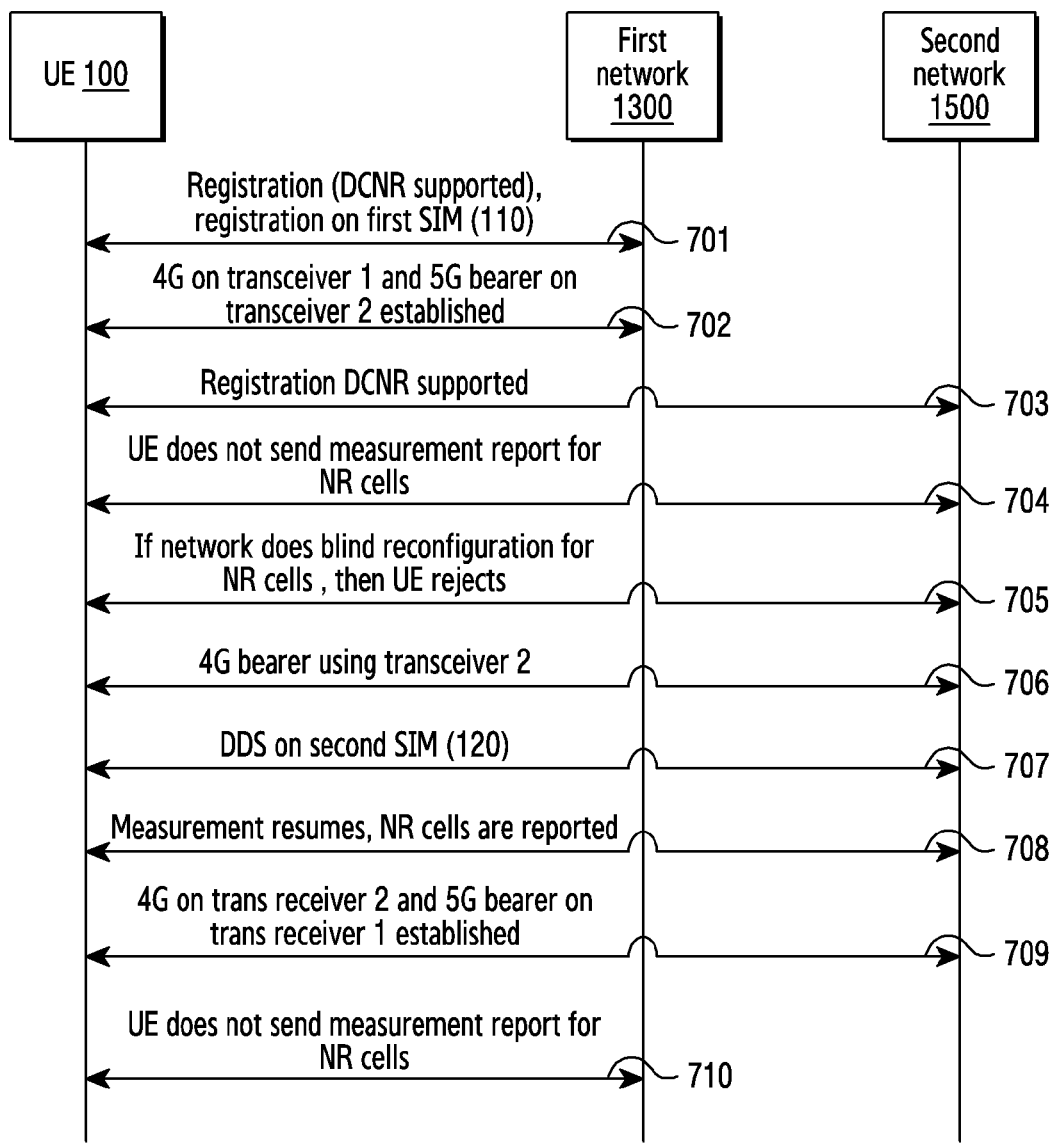

APPARATUS AND METHOD FOR PROVIDING VOICE CALL AND DATA SERVICE SIMULTANEOUSLY ON PLURALITY OF SIM

CROSS-REFERENCE TO RELATED APPLICATIONS

This application is a 371 of International Application No. PCT/KR2019/010920 filed on Aug. 27, 2019, which claims priority to India Patent Application No. 201841031991 filed on Aug. 27, 2018 and India Patent Application No. 201841031991 filed on Aug. 23, 2019, the disclosures of which are herein incorporated by reference in their entirety.

BACKGROUND

1. Field

The embodiments herein relate to wireless communication, and more particularly, to a method and a user equipment (UE) for providing voice call and data service simultaneously on plurality of SIM in a wireless communication network.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In general, a dual Subscriber Identification Module (SIM) dual standby (DSDS) device has a single transceiver and hence only one of the dual SIM can be active at a time. However, with the advancement in technology, the DSDS devices with Evolved-Universal Terrestrial Radio Access Network New Radio-Dual Connectivity (EN-DC) capability have been launched. The DSDS devices with the EN-DC capability have two transceivers and hence should have been able to accommodate active services on both the SIMS of the dual SIM of the DSDS device. However, there exists no mechanism for providing the active services on both the SIMS of the dual SIM of the DSDS device.

The above information is presented as background information only to help the reader to understand the present invention. Applicants have made no determination and make no assertion as to whether any of the above might be applicable as prior art with regard to the present application.

The principal object of the embodiments herein is to provide a method and user equipment (UE) for providing voice call and data service simultaneously on plurality of SIM in a wireless communication network.

Another object of the embodiments herein is to determine a 4G bearer is established on a first transceiver and a 5G bearer is established on a second transceiver by the first network using a first SIM.

Another object of the embodiments herein is to determine a voice call is being initiated on a second SIM when a data service is active on the first SIM through the first transceiver and the second transceiver.

Another object of the embodiments herein is to configure the second SIM to provide the voice call over the second transceiver and the first SIM to provide the data services over the first transceiver Another object of the embodiments herein is to provide a video call on a 5G Split bearer of the first SIM when there is no ongoing data session on the second SIM.

Another object of the embodiments herein is to provide 5G service in the ENDC capable UE i.e., by providing data services on the first SIM and the video call on the second SIM.

SUMMARY

Accordingly, the embodiments herein provide a method for providing voice call and data service simultaneously on a plurality of Subscriber Identification Module (SIM) in an Evolved-Universal Terrestrial Radio Access Network New Radio-Dual Connectivity (EN-DC) capable User Equipment (UE) (100). The method includes registering, by the UE (100), a first SIM (110) of the plurality of SIM to a first network in a Dual Connectivity with NR (DCNR) supported mode using a first transceiver (T1) (130) and registering, by the UE (100), a second SIM (120) of the plurality of SIM to a second network in a Dual Connectivity with NR (DCNR) not supported mode using a second transceiver (T2) (140). The method also includes determining, by the UE (100), a 4G bearer is established on the first transceiver (130) and a 5G bearer is established on the second transceiver (140) by the first network using the first SIM (110). Further, the method includes determining, by the UE (100), the voice call is being initiated on the second SIM (120) when the data service is active on the first SIM (110) through the first transceiver (130) and the second transceiver (140); and configuring, by the UE (100), the second SIM (120) to provide the voice call over the second transceiver (140) and the first SIM (110) to provide the data services over the first transceiver (130).

Accordingly, the embodiments herein provide an Evolved-Universal Terrestrial Radio Access Network New Radio-Dual Connectivity (EN-DC) capable User Equipment (UE) (100) for providing voice call and data service simultaneously on a plurality of Subscriber Identification Module (SIM). The UE (100) includes a memory (150) and a processor (160) coupled to the memory (150). The processor (160) is configured to register a first SIM (110) of the plurality of SIM to a first network in a Dual Connectivity with NR (DCNR) supported mode using a first transceiver (T1) (130) and register a second SIM (120) of the plurality of SIM to a second network in a Dual Connectivity with NR (DCNR) not supported mode using a second transceiver (T2) (140). The processor (160) is also configured to determine a 4G bearer is established on the first transceiver (130) and a 5G bearer is established on the second transceiver (140) by the first network using the first SIM (110) and determine the voice call is being initiated on the second SIM (120) when the data service is active on the first SIM (110) through the first transceiver (130) and the second transceiver (140). Further, the processor (160) is configured to configure the second SIM (120) to provide the voice call over the second transceiver (140) and the first SIM (110) to provide the data services over the first transceiver (130).

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Various embodiments of the present disclosure provide voice call and data service simultaneously on plurality of SIM in EN-DC capable UE.

BRIEF DESCRIPTION OF THE DRAWINGS

This invention is illustrated in the accompanying drawings, throughout which like reference letters indicate corresponding parts in the various figures. The embodiments herein will be better understood from the following description with reference to the drawings, in which:

FIG. 1A is a block diagram of a UE for providing a voice call and a data service simultaneously on a plurality of Subscriber Identification Module (SIM), according to an embodiment as disclosed herein;

FIG. 1B is a block diagram of a processor of the UE for providing the voice call and the data service simultaneously on the plurality of SIM, according to an embodiment as disclosed herein;

FIG. 2A is a flow chart illustrating a method for providing the voice call and the data service simultaneously on the plurality of SIM in the UE, according to an embodiment as disclosed herein;

FIG. 2B is a flow chart illustrating a method for configuring a second SIM to provide the voice call over a second transceiver (T2) and a first SIM to provide the data services over a first transceiver (T1) by disabling a 5G bearer by sending a Tracking Area Update (TAU) message to a first network, according to an embodiment as disclosed herein;

FIG. 2C is a flow chart illustrating a method for configuring the second SIM to provide the voice call over the second transceiver and the first SIM to provide the data services over the T1 by disabling the 5G bearer by sending a Non-Access Stratum (NAS) message to the first network, according to an embodiment as disclosed herein;

FIG. 2D is a flow chart illustrating a method for configuring the second SIM to provide the voice call over the T2 and the first SIM to provide the data services over the T1 by disabling the 5G bearer and the 4G bearer by sending an extended service request message, according to an embodiment as disclosed herein;

FIG. 2E is a flow chart illustrating a method for configuring the second SIM to provide the voice call over the T2 and the first SIM to provide the data services over the T1 by initiating a Secondary Cell Group Radio Link Failure (SCG RLF) on the T2, according to an embodiment as disclosed herein;

FIG. 3 illustrates TRM operations for the UE with the first SIM and the second SIM, according to an embodiment as disclosed herein;

FIG. 4A illustrates that the UE (100) with Evolved-Universal Terrestrial Radio Access Network New Radio-Dual Connectivity (EN-DC) capability is not able to provide the voice call on the first SIM and the data services on the second SIM simultaneously, according to a prior art;

FIG. 4B illustrates a mechanism by which the UE (100) with ENDC capability provides services on both the first SIM and second SIM simultaneously, according to an embodiment as disclosed herein;

FIG. 4C is a signaling diagram illustrating a method for configuring the second SIM to provide the voice call over the T2 and the first SIM to provide the data services over the T1 by disabling the 5G bearer by sending the Tracking Area Update (TAU) message to the first network, according to an embodiment as disclosed herein;

FIG. 4D is a signaling diagram illustrating a method for configuring the second SIM to provide the voice call over the T2 and the first SIM to provide the data services over the T1 by disabling the 5G bearer by sending a Non-Access Stratum (NAS) message to the first network, according to an embodiment as disclosed herein;

FIG. 4E is a signaling diagram illustrating a method for configuring the second SIM to provide the voice call over the T2 and the first SIM to provide the data services over the T1 by disabling the 5G bearer and the 4G bearer by sending an extended service request message, according to an embodiment as disclosed herein;

FIG. 4F is a signaling diagram illustrating a method for configuring the second SIM to provide the voice call over the T2 and the first SIM to provide the data services over the T1 by initiating the Secondary Cell Group Radio Link Failure (SCG RLF) on the T2, according to an embodiment as disclosed herein;

FIG. 5A illustrates an existing mechanism in the UE with the ENDC capability which is operating in a dual SIM configuration, according to prior art;

FIG. 5B illustrates a mechanism in the UE with the ENDC capability for providing the video call on the 5G bearer, while operating in the dual SIM configuration, according to an embodiment as disclosed herein;

FIG. 5C is a signaling diagram illustrating mechanism in the UE with the ENDC capability for providing the video call on the 5G bearer, while operating in the dual SIM configuration, according to an embodiment as disclosed herein;

FIG. 6A illustrates a mechanism in the UE with the ENDC capability for providing the data session on the T1 and the video call on the T2 with single uplink (SUL) configuration, according to an embodiment as disclosed herein;

FIG. 6B illustrates a mechanism in the UE with the ENDC capability for providing a 5G data on the first SIM and a 5G video call on the second SIM when the single uplink (SUL) configuration is enabled on the first SIM and the second SIM, according to an embodiment as disclosed herein;

FIG. 6C is a signaling diagram illustrating the mechanism of the UE to provide the 5G data on the first SIM and the 5G video call on the second SIM when the single uplink (SUL)

configuration is enabled on the first SIM and the second SIM, according to an embodiment as disclosed herein;

FIG. 6D is a signaling diagram illustrating the mechanism of the UE to provide a voice/video call on the 4G bearer when the single uplink (SUL) configuration is enabled on the first SIM and the second SIM, according to an embodiment as disclosed herein;

FIG. 7A illustrates a mechanism of the UE with the ENDC capability for switching a default data subscription (DDS) from the first SIM to the second SIM, according to an embodiment as disclosed herein;

FIG. 7B illustrates a mechanism of the UE with the ENDC capability for switching the DDS from the first SIM to the second SIM to provide 5G services on the first SIM and the second SIM, according to an embodiment as disclosed herein; and FIG. 7C is a signaling diagram for the mechanism of the UE with the ENDC capability for switching the DDS from the first SIM to the second SIM to provide the 5G services on the first SIM and the second SIM, according to an embodiment as disclosed herein.

DETAILED DESCRIPTION

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments.

Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units, engines, manager, modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

In the entire application the terms first SIM (110) and the second SIM (120) can be used interchangeably depending on the usage.

In the entire application the terms first network (1300) and the second network (1500) can be used interchangeably depending on the usage.

In the entire application the terms first transceiver (130) and the second transceiver (140) can be used interchangeably depending on the usage.

Accordingly, the embodiments herein provide an Evolved-Universal Terrestrial Radio Access Network New Radio-Dual Connectivity (EN-DC) capable User Equipment (UE) (100) for providing voice call and data service simultaneously on a plurality of Subscriber Identification Module (SIM). The UE (100) includes a memory (150) and a processor (160) coupled to the memory (150). The processor (160) is configured to register a first SIM (110) of the plurality of SIM to a first network in a Dual Connectivity with NR (DCNR) supported mode using a first transceiver (T1) (130) and register a second SIM (120) of the plurality of SIM to a second network in a Dual Connectivity with NR (DCNR) not supported mode using a second transceiver (T2) (140). The processor (160) is also configured to determine a 4G bearer is established on the first transceiver (130) and a 5G bearer is established on the second transceiver (140) by the first network using the first SIM (110) and determine the voice call is being initiated on the second SIM (120) when the data service is active on the first SIM (110) through the first transceiver (130) and the second transceiver (140). Further, the processor (160) is configured to configure the second SIM (120) to provide the voice call over the second transceiver (140) and the first SIM (110) to provide the data services over the first transceiver (130).

In an embodiment, configuring, by the UE (100), the second SIM (120) to provide the voice call over the second transceiver (140) and the first SIM (110) to provide the data services over the first transceiver (130) includes sending a first Tracking Area Update (TAU) message to the first network to disable the 5G bearer established between the first network and the first SIM (110) on the second transceiver (140), by setting a DCNR bit to "dual connectivity with NR not supported" mode. The method also includes determining that the 5G bearer established between the first network and the first SIM (110) on the second transceiver (140) is released by the first network, in response to the first TAU message; and configuring the second SIM (120) to provide the voice call over the second transceiver (140) and the first SIM (110) to provide the data services over the first transceiver (130).

In an embodiment, further the method includes determining that the voice call on the second SIM (120) is ended and sending a one of a Non-Access Stratum (NAS) message and a Radio Resource Control (RRC) message to the first network to re-establish the 5G bearer between the first network and the first SIM (110) on the second transceiver (140), wherein the one of the NAS and the RRC message is a second TAU message and wherein the 5G bearer between the first network and the first SIM (110) is re-established by setting a DCNR bit to "dual connectivity with NR supported" mode in the second TAU message.

In an embodiment, configuring, by the UE (100), the second SIM (120) to provide the voice call over the second transceiver (140) and the first SIM (110) to provide the data services over the first transceiver (130) includes sending a Non-Access Stratum (NAS) message to the first network to disable the 5G bearer established between the first network and the first SIM (110) on the second transceiver (140), by setting a DCNR bit to "dual connectivity with NR not supported" mode. Further, the method includes determining that the 5G bearer established between the first network and the first SIM (110) on the second transceiver (140) is released by the first network, in response to the NAS message; and configuring the second SIM (120) to provide the voice call over the second transceiver (140) and the first SIM (110) to provide the data services over the first transceiver (130).

In an embodiment, the method further includes determining that the voice call on the second SIM (120) is ended and sending one of a Non-Access Stratum (NAS) message and a Radio Resource Control (RRC) message to the first network to re-establish the 5G bearer between the first network and the first SIM (110) on the second transceiver (140), wherein the one of the NAS and the RRC message is a TAU message and wherein the 5G bearer between the first network and the first SIM (110) is re-established by setting a DCNR bit to "dual connectivity with NR supported" mode in the second TAU message.

In an embodiment, configuring, by the UE (100), the second SIM (120) to provide the voice call over the second transceiver (140) and the first SIM (110) to provide the data services over the first transceiver (130) includes sending an extended service request message to the first network to release the 5G bearer established between the first network and the first SIM (110) on the second transceiver (140) and the 4G bearer established between the first network and the first SIM (110) on the first transceiver (130), where extended service request message to the first network moves the UE (100) to an Idle mode. Further, the method includes sending the first Tracking Area Update (TAU) message to the first network by setting the DCNR bit to "dual connectivity with NR not supported" mode to disable the NR and sending, by the UE (100), an indication to the first network to establish the 4G bearer between the first network and the first SIM (110) on the first transceiver (130) based on a data session, wherein the 4G bearer is used to provide the data service. Furthermore, the method includes configuring the second SIM (120) to provide the voice call over the second transceiver (140) and the first SIM (110) to provide the data services over the first transceiver (130).

In an embodiment, further the method includes determining that the voice call on the second SIM (120) is ended and sending one of the Non-Access Stratum (NAS) message and a Radio Resource Control (RRC) message to the first network to re-establish the 5G bearer between the first network and the first SIM (110) on the second transceiver (140), where the one of the NAS and the RRC message is a second TAU message and wherein the 5G bearer between the first network and the first SIM (110) is re-established by setting a DCNR bit to "dual connectivity with NR supported" mode in the second TAU message.

In an embodiment, configuring, by the UE (100), the second SIM (120) to provide the voice call over the second transceiver (140) and the first SIM (110) to provide the data services over the first transceiver (130) includes initiating a Secondary Cell Group Radio Link Failure (SCG RLF) on the second transceiver (140) and determining the 5G bearer established between the first network and the first SIM (110) on the second transceiver (140) is released by the first network, in response to the SCG RLF. Further, the method includes suspending a measurement report for NR cells to be sent to the first network and sending an indication to the first network to establish the 4G bearer between the first network and the first SIM (110) on the first transceiver (130), wherein the 4G bearer is used to provide the data service. Furthermore, the method includes configuring the second SIM (120) to provide the voice call over the second transceiver (140) and the first SIM (110) to provide the data services over the first transceiver (130).

In an embodiment, further the method includes determining that the voice call on the second SIM (120) is ended and resuming the measurement report for the NR cells. The method also includes configuring the data service on the 4G bearer established on the first transceiver (130) and the 5G bearer established on the second transceiver (140) by the first network using the first SIM (110).

In an embodiment, further the method includes determining, by the UE (100), a data session is initiated on the first SIM (110) using the first transceiver (130) and determining, by the UE (100), a video call is initiated on the second SIM (120) using the second transceiver (140). The method also includes determining, by the UE (100), one of: the data session is ended, a RRC connection is released by the first network, a mobile data is turned off on the first SIM (110) and sending, by the UE (100), the first TAU message to the first network with the DCNR bit set to the DCNR not supported mode, wherein the first TAU message indicates to the first network to disable the 5G bearer established between the first SIM (110) and the first network. Furthermore, the method includes sending, by the UE (100), the second TAU message to the second network with the DCNR bit set to the DCNR supported mode, wherein the second TAU message indicates to the second network to enable the 5G bearer between the second SIM (120) and the second network; configuring, by the UE (100), the second SIM (120) to provide a 5G video over the first transceiver (130) and the 4G service over the second transceiver (140); and sending, by the UE (100), an IMS signaling to the second network indicating to upgrade a bit rate of the video call by shifting the video call over the 5G bearer.

In an embodiment, further the method includes determining, by the UE (100), a default data subscription (DDS) is set on the first SIM (110) and determining, by the UE (100), the first SIM (110) is camped on a LTE band which is configured for a Single UL Transmission (SUL). Further, the method includes registering, by the UE (100), the first SIM (110) to the LTE network in the DCNR bit to "dual connectivity with NR supported" mode on the second transceiver (140) and determining, by the UE (100), a LTE-NR DC band combination is configured for a SUL operation as per TS 38.101-3 of 3GPP spec and one of the UE (100) and the LTE network supports the LTE-NR DC band combination; initiating, by the UE (100), the data session on the first SIM (110) using the first transceiver (130) on the first SIM (110) using the SUL operation for 5G Data Packets using one of a split bearer and a Secondary Cell Group (SCG) bearer. Furthermore, the method includes determining, by the UE (100), the second SIM (120) is camped on the LTE band which is configured for the SUL and registering, by the UE (100), the second SIM (120) to the LTE network in the DCNR bit to "dual connectivity with NR supported" mode on the first transceiver (130). The method also includes determining, by the UE (100), whether the LTE-NR ENDC combination is configured for the SUL as per TS 38.101-3 of 3GPP spec and one of the UE (100) and the LTE network supports the SUL on the LTE-NR ENDC combination based on a NR frequency configuration in a RRC Reconfiguration Message and initiating, by the UE (100), the video call on the second SIM (120) using the second transceiver (140) and enabling, by the UE (100), the video call on the second SIM (120) using a SUL operation for 5G video packets using one of the split bearer with the 4G or the SCG bearer.

In an embodiment, further the method includes determining, by the UE (100), a default data subscription (DDS) is set on the first SIM (110) and determining, by the UE (100), the first SIM (110) is camped on a LTE band which is configured for a Single Uplink (SUL) by 3GPP and supported by both the UE (100) and a LTE network. Further, the method includes registering, by the UE (100), the first SIM (110) to the LTE network in the DCNR bit to "dual connectivity with NR supported" mode on the second transceiver (140) and determining, by the UE (100), the LTE-NR DC band combinations is configured for SUL Operation as per 3GPP and supported by both the UE (100) and the LTE network. Furthermore, the method includes initiating, by the UE (100), the data session on the first SIM (110) using the first transceiver (130) on the first SIM (110) using the SUL operation for 5G Data Packets using one of a split bearer and a SCG bearer and determining, by the UE (100), the second SIM (120) is camped on the LTE band which is configured for the SUL. The method also includes registering, by the UE (100), the second SIM (120) to the LTE network in the DCNR bit to "dual connectivity with NR supported" mode on the first transceiver (130) and determining, by the UE (100), one of the LTE-NR ENDC combination is not configured for the SUL as per TS 38.101-3 of 3GPP spec and one of the UE (100) and the LTE network does not support the SUL on the LTE-NR ENDC combination based on a NR frequency configuration in a RRC Reconfiguration message and initiating, by the UE (100), one of the video call and the voice call on the second SIM (120) using the second transceiver (140) on the 4G bearer without the NR.

In an embodiment, further the method includes determining, by the UE (100), that default data subscription (DDS) is activated on the first SIM (110) and enabling, by the UE (100), the NR on the first SIM (110) and the second SIM (120). The method also includes suspending, by the UE (100), a measurement report for NR cells to be sent to the second network; sending, by the UE (100), an indication to the second network to establish the 4G bearer between the second network and the second SIM (120) on the second transceiver (140), wherein the 4G bearer is used to provide the data service; and determining, by the UE (100), that the default data subscription (DDS) is switched to the second SIM (120) from the first SIM (110). Furthermore, the method includes resuming, by the UE (100), a transmission of the measurement report for the for the NR cells on the second SIM (120); configuring, by the UE (100), the second SIM (120) to provide: 5G service over the first transceiver (130) and 4G service over the second transceiver (140); and suspending, by the UE (100), the measurement report for the NR cells to be sent to the first network.

In an embodiment, the EN-DC capability is indicated on at least one of the first SIM (110) and the second SIM (120) and where the EN-DC capability on at least one of the first SIM (110) and the second SIM (120) is changed dynamically based on an event associated with one of the first SIM (110) and the second SIM (120), where the event is one of the voice call, the data service, the video call.

Referring now to the drawings, and more particularly to FIGS. 1 through 9B, where similar reference characters denote corresponding features consistently throughout the figures, there are shown preferred embodiments and prior arts for comparison with the preferred embodiments. FIG. 1A is a block diagram of the UE (100) for providing the voice call and the data service simultaneously on the plurality of Subscriber Identification Module (SIM), according to an embodiment as disclosed herein.

Referring to the FIG. 1A, the UE (100) can be, for example, a mobile phone, a smart phone, Personal Digital Assistant (PDA), a tablet, a wearable device, or the like.

In an embodiment, the UE (100) can include a first Subscriber Identification Module (SIM) (110), a second SIM (120), a first transceiver (T1) (130), a second transceiver (T2) (140), a memory (150) and a processor (160).

In an embodiment, the first SIM (110) of the UE (100) is registered to a first network (1300) in a Dual Connectivity with NR (DCNR) supported mode using the T1 (130) and the second SIM (120) to a second network (1500) in a Dual Connectivity with NR (DCNR) not supported mode using the T2 (140). The first SIM (110) and the second SIM (120) are among the plurality of SIMS of the UE (100) and may be used interchangeably. The first network (1300) and the second network (1500) may be for example one of a LTE network and a 5G network. The first network (1300) and the second network (1500) may be used interchangeably.

The EN-DC capability is indicated on at least one of the first SIM (110) and the second SIM (120) and wherein the EN-DC capability on at least one of the first SIM (110) and the second SIM (120) is changed dynamically based on an event associated with one of the first SIM (110) and the second SIM (120), wherein the event is one of the voice call, the data service, the video call. For examples, when high speed data is transferred on SIM1, UE indicates EN-DC on If Video call is initiated on SIM2 and needs 5G bearer then EN-DC capability is indicated on SIM2 (disabled on SIM1). During active EN-DC mode on SIM1, device listens to SIM2 paging for incoming Call/Data.

In an embodiment, the first transceiver (T1) (130) and the second transceiver (T2) (140) are configured to communicate with at least one of the first network (1300) and the second network (1500). Further, both the T1 (130) and the T2 (140) may be assigned to one of the first SIM (110) and the second SIM (120) using split bearers by one of the first network (1300) and the second network (1500).

In an embodiment, the memory (150) can include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (150) may, in some examples, be considered a non-transitory storage medium. The term "non-transitory" may indicate that the storage medium is not embodied in a carrier wave or a propagated signal. However, the term "non-transitory" should not be interpreted that the memory (150) is non-movable. In some examples, the memory (150) is configured to store larger amounts of information than the memory. In certain examples, a non-transitory storage medium may store data that can, over time, change (e.g., in Random Access Memory (RAM) or cache).

In an embodiment, the processor (160) is configured to determine a 4G bearer is established on the T1 (130) and a 5G bearer is established on the T2 (140) by the first network (1300) using the first SIM (110). Further, the processor (160) is also configured to determine the voice call is being initiated on the second SIM (120) when the data service is active on the first SIM (110) through the T1 (130) and the T2 (140) and configure the second SIM (120) to provide the voice call over the T2 (140) and the first SIM (110) to provide the data services over the T1 (130). The processor (160) configures the second SIM (120) to provide the voice call over the T2 (140) and the first SIM (110) to provide the data services over the T1 (130) by one of: sending a Tracking Area Update (TAU) message to the first network (1300) to indicate to disable the 5G bearer established between the first network (1300) and the first SIM (110) on the T2 (140); sending a Non-Access Stratum (NAS) message to the first network (1300) to indicate to disable the 5G bearer established between the first network (1300) and the first SIM (110) on the T2 (140); sending an extended service request message to the first network (1300) to indicate to release the 5G bearer established between the first network (1300) and the first SIM (110) on the T2 (140) and the 4G bearer established between the first network (1300) and the first SIM (110) on the T1 (130) and move the UE (100) to an idle mode; initiating a Secondary Cell Group Radio Link Failure (SCG RLF) on the T2 (140) to indicate to release the 5G bearer established between the first network (1300) and the first SIM (110) on the T2 (140).

In another embodiment, the processor (160) after configuring the second SIM (120) to provide the voice call over the T2 (140) and the first SIM (110) to provide the data services over the T1 (130), further configures the second SIM (120) to provide a 5G video over the T1 (130) and the 4G service over the T2 (140) and upgrade a bit rate of the video call by shifting the video call over the 5G bearer.

In yet another embodiment, the processor (160) after configuring the second SIM (120) to provide the voice call over the T2 (140) and the first SIM (110) to provide the data services over the T1 (130), further enabled the video call on the second SIM (120) using a SUL operation for 5G video packets and the data session on the first SIM (110) using the SUL operation for the 5G Data Packets, simultaneously.

In yet another embodiment, the processor (160) after configuring the second SIM (120) to provide the voice call over the T2 (140) and the first SIM (110) to provide the data services over the T1 (130), further provides 5G services on the first SIM (110) and the second SIM (120).

Although the FIG. 1A shows the hardware elements of the UE (100) but it is to be understood that other embodiments are not limited thereon. In other embodiments, the UE (100) may include less or more number of elements. Further, the labels or names of the elements are used only for illustrative purpose and does not limit the scope of the invention. One or more components can be combined together to perform same or substantially similar function.

FIG. 1B is a block diagram of the processor (160) of the UE (100) for providing the voice call and the data service simultaneously on the plurality of Subscriber Identification Module (SIM), according to an embodiment as disclosed herein.

Referring to the FIG. 1B, the processor (160) of the UE (100) includes a registration management engine (162), a bearer management engine (164), a configuration management engine (166) and an event management engine (168).

In an embodiment, the registration management engine (162) is configured to register the first SIM (110) to the first network (1300) in the Dual Connectivity with NR (DCNR) supported mode using the T1 (130) and register the second SIM (120) of the plurality of SIM to the second network (1500) in the Dual Connectivity with NR (DCNR) not supported mode using the T2 (140). In another example embodiment, the registration management engine (162) is configured to send one of: a second TAU message to the first network (1300) and the Non-Access Stratum (NAS) message to establish the 5G bearer between the first network (1300) and the first SIM (110) on the T2 (140) by setting the DCNR bit to "dual connectivity with NR supported" mode after the voice call is determined to have ended. In another example embodiment, the registration management engine (162) is configured to send the extended service request message to the first network (1300) to release the 5G bearer established between the first network (1300) and the first SIM (110) on the T2 (140) and the 4G bearer established between the first network (1300) and the first SIM (110) on the T1 (130).

In another example embodiment, the registration management engine (162) is configured to send the first TAU message to the first network (1300) with the DCNR bit set to the DCNR not supported mode to indicate to the first network (1300) to disable the 5G bearer established between the first SIM (110) and the first network (1300) and send the second TAU message to the second network (1500) with the DCNR bit set to the DCNR supported mode to indicate to the second network (1500) to enable the 5G bearer between the second SIM (120) and the second network (1500).

In another example embodiment, the registration management engine (162) is configured to determine the first SIM (110) is camped on a LTE band which is configured for the SUL and register the first SIM (110) to a LTE network in the DCNR bit to "dual connectivity with NR supported" mode on the second transceiver (140). Further, the registration management engine (162) is configured to determine the second SIM (120) is camped on the LTE band which is configured for the SUL and register the second SIM (120) to the LTE network in the DCNR bit to "dual connectivity with NR supported" mode on the first transceiver (130).

In an embodiment, the bearer management engine (164) is configured to determine the 4G bearer is established on the T1 (130) and the 5G bearer is established on the T2 (140) by the first network (1300) using the first SIM (110). The bearer management engine (164) is configured to send the first Tracking Area Update (TAU) message to the first network (1300) to disable the 5G bearer established between the first network (1300) and the first SIM (110) on the T2 (140) by setting the DCNR bit to "dual connectivity with NR not supported" mode and determine that the 5G bearer on the T2 (140) is released by the first network (1300) in response to the first TAU message.

In another example embodiment, the bearer management engine (164) is configured to initiate the Secondary Cell Group Radio Link Failure (SCG RLF) on the T2 (140) to release the 5G bearer established between the first network and the first SIM (110) on the second transceiver (140).

In an embodiment, the event management engine (166) is configured to determine an event such as the voice call is being initiated on the second SIM (120) when the data service is active on the first SIM (110) through the first transceiver (130) and the second transceiver (140). The event management engine (166) is also configured to monitor and determine that the voice call on the second SIM (120) is ended.

The event management engine (166) is configured to suspend a measurement report for NR cells to be sent to the first network (1300) in response to the 5G bearer being released in response to the SCG RLF on the T2 (140). Further, the event management engine (166) is configured to resume the measurement report for the NR cells when the voice call on the second SIM (120) is ended.

In another example embodiment, the event management engine (166) is configured to determine a data session is initiated on the first SIM (110) using the T1 (130) and the video call is initiated on the second SIM (120) using the T2 (140). Further, the event management engine (166) is configured to determine one of: the data session is ended, a RRC connection is released by the first network (1300), a mobile data is turned off on the first SIM (110).

In another example embodiment, the event management engine (166) is configured to initiate the video call on the second SIM (120) using the T2 (140) and the data session on the first SIM (110) using the T1 (130).

In another example embodiment, the event management engine (166) is configured to determine the DDS is activated on the first SIM (110) and enable the NR on the first SIM (110) and the second SIM (120). Further, the event management engine (166) is configured to suspend the measurement report for the NR cells to be sent to the second network (1500) and send an indication to the second network (1500) to establish the 4G bearer between the second network (1500) and the second SIM (120) on the T2 (140). The event management engine (166) is also configured to determine the DDS is switched to the second SIM (120) from the first SIM (110) and resume a transmission of the measurement report for the for the NR cells on the second SIM (120).

In an embodiment, the configuration management engine (168) is configured to configure the second SIM (120) to provide the voice call over the T2 (140) and the first SIM (110) to provide the data services over the T1 (130). The configuration management engine (168) also configures the data service on the 4G bearer established on the T1 (130) and the 5G bearer established on the T2 (140) by the first network (1300) using the first SIM (110).

In another example embodiment, configuration management engine (168) configures second SIM (120) to provide: the 5G video over the T1 (130) and the 4G service over the T2 (140) and send the IMS signaling to the second network (1500) indicating to upgrade the bit rate of the video call by shifting the video call over the 5G bearer.

In another example embodiment, configuration management engine (168) configured to enable the video call on the second SIM (120) using 5G video packets and the data session on the first SIM (110) using a SUL operation for the 5G video packets and the data session on the first SIM (110) using the SUL operation for the 5G Data Packets, simultaneously.

FIG. 2A is a flow chart 200 illustrating a method for providing the voice call and the data service simultaneously on the plurality of SIM in the UE (100), according to an embodiment as disclosed herein.

Referring to the FIG. 2A, in the UE (100) as illustrated in the FIG. 1A, the processor (160) is configured to perform the steps from 210 to 250.

At step 210, the UE (100) registers the first SIM (110) of the plurality of SIM to the first network in the Dual Connectivity with NR (DCNR) supported mode using the first transceiver (T1) (130).

At step 220, the UE (100) registers the second SIM (120) of the plurality of SIM to the second network in the Dual Connectivity with NR (DCNR) not supported mode using the second transceiver (T2) (140).

At step 230, the UE (100) determines the 4G bearer is established on the T1 (130) and the 5G bearer is established on the T2 (140) by the first network using the first SIM (110). At step 240, the UE (100) determines the voice call is being initiated on the second SIM (120) when the data service is active on the first SIM (110) through the T1 (130) and the T2 (140).

At step 250, the UE (100) configures the second SIM (120) to provide the voice call over the T2 (140) and the first SIM (110) to provide the data services over the T1 (130).

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

FIG. 2B is a flow chart illustrating a method for configuring the second SIM (120) to provide the voice call over the T2 (140) and the first SIM (110) to provide the data services over the T1 (130) by disabling the 5G bearer by sending the Tracking Area Update (TAU) message to the first network (1300), according to an embodiment as disclosed herein.

Referring to the FIG. 2B, in the UE (100) as illustrated in the FIG. 1A, the processor (160) is configured to perform the steps from 251a to 256a.

At step 251a, the UE (100) sends the first Tracking Area Update (TAU) message to the first network to disable the 5G bearer established between the first network and the first SIM (110) on the T2 (140) by setting the DCNR bit to "dual connectivity with NR not supported" mode.

At step 252a, the UE (100) determines that the 5G bearer established between the first network and the first SIM (110) on the T2 (140) is released by the first network, in response to the first TAU message At step 253a, the UE (100) configures the second SIM (120) to provide the voice call over the T2 (140) and the first SIM (110) to provide the data services over the T1 (130)

At step 254a, the UE (100) determines that the voice call on the second SIM (120) is ended.

At step 255a, the UE (100) sends the second TAU message to the first network to establish the 5G bearer between the first network and the first SIM (110) on the T2 (140) by setting the DCNR bit to "dual connectivity with NR supported" mode.

At step 256a, the UE (100) configures the data service on the 4G bearer established on the T1 (130) and the 5G bearer established on the T2 (140) by the first network using the first SIM (110).

FIG. 2C is a flow chart illustrating a method for configuring the second SIM (120) to provide the voice call over the T2 (140) and the first SIM (110) to provide the data services over the T1 (130) by disabling the 5G bearer by sending the Non-Access Stratum (NAS) message to the first network, according to an embodiment as disclosed herein.

Referring to the FIG. 2C, in the UE (100) as illustrated in the FIG. 1A, the processor (160) is configured to perform the steps from 251b to 256b.

At step 251b, the UE (100) sends the Non-Access Stratum (NAS) message to the first network to disable the 5G bearer established between the first network and the first SIM (110) on the T2 (140) by setting the DCNR bit to "dual connectivity with NR not supported" mode.

At step 252b, the UE (100) determines that the 5G bearer established between the first network and the first SIM (110) on the T2 (140) is released by the first network, in response to the NAS message.

At step 253b, the UE (100) configures the second SIM (120) to provide the voice call over the T2 (140) and the first SIM (110) to provide the data services over the T1 (130)

At step 254b, the UE (100) determines that the voice call on the second SIM (120) is ended.

At step 255b, the UE (100) sends the TAU message to the first network to establish the 5G bearer between the first network and the first SIM (110) on the T2 (140), by setting the DCNR bit to "dual connectivity with NR supported" mode.

At step 256b, the UE (100) configures the data service on the 4G bearer established on the T1 (130) and the 5G bearer established on the T2 (140) by the first network using the first SIM (110).

FIG. 2D is a flow chart illustrating a method for configuring the second SIM (120) to provide the voice call over the T2 (140) and the first SIM (110) to provide the data services over the T1 (130) by disabling the 5G bearer and the 4G bearer by sending the extended service request message, according to an embodiment as disclosed herein.

Referring to the FIG. 2D, in the UE (100) as illustrated in the FIG. 1A, the processor (160) is configured to perform the steps from 251c to 257c.

At step 251c, the UE (100) sends the extended service request message to the first network to release the 5G bearer established between the first network and the first SIM (110) on the T2 (140) and the 4G bearer established between the first network and the first SIM (110) on the T1 (130).

At step 252c, the UE (100) sends the first Tracking Area Update (TAU) message to the first network by setting the DCNR bit to "dual connectivity with NR not supported" mode to disable the NR.

At step 253c, the UE (100) sends the indication to the first network to establish the 4G bearer between the first network and the first SIM (110) on the T1 (130) based on the data session.

At step 254c, the UE (100) configures the second SIM (120) to provide the voice call over the T2 (140) and the first SIM (110) to provide the data services over the T1 (130).

At step 255c, the UE (100) determines that the voice call on the second SIM (120) is ended.

At step 256c, the UE (100) sends the second TAU message to the first network to establish the 5G bearer between the first network and the first SIM (110) on the T2 (140), by setting the DCNR bit to "dual connectivity with NR supported" mode.

At step 257c, the UE (100) configures the data service on the 4G bearer established on the T1 (130), and the 5G bearer established on the T2 (140) by the first network using the first SIM (110).

FIG. 2E is a flow chart illustrating a method for configuring the second SIM (120) to provide the voice call over the T2 (140) and the first SIM (110) to provide the data services over the T1 (130) by initiating the Secondary Cell Group Radio Link Failure (SCG RLF) on the T2 (140), according to an embodiment as disclosed herein.

Referring to the FIG. 2E, in the UE (100) as illustrated in the FIG. 1A, the processor (160) is configured to perform the steps from 251d to 258d.

At step 251d, the UE (100) initiates the secondary Cell Group Radio Link Failure (SCG RLF) on the T2 (140).

At step 252d, the UE (100) determines the 5G bearer established between the first network and the first SIM (110) on the T2 (140) is released by the first network, in response to the SCG RLF.

At step 253d, the UE (100) suspends the measurement report for NR cells to be sent to the first network.

At step 254d, the UE (100) sends the indication to the first network to establish the 4G bearer between the first network and the first SIM (110) on the T1 (130).

At step 255d, the UE (100) configures the second SIM (120) to provide the voice call over the T2 (140) and the first SIM (110) to provide the data services over the T1 (130).

At step 256d, the UE (100) determines that the voice call on the second SIM (120) is ended.

At step 257d, the UE (100) resumes the measurement report for the NR cells.

At step 258d, the UE (100) configures the data service on the 4G bearer established on the T1 (130) and the 5G bearer established on the T2 (140) by the first network using the first SIM (110).

FIG. 3 illustrates the TRM operations for the UE (100) with the first SIM (130) and the second SIM (140), according to an embodiment as disclosed herein.

In the conventional methods and systems, the UE (100) is generally DSDS capable only one SIM can be active at any point of time and hence is not capable of accommodating the voice call on the first SIM (130) and the data services on the second SIM (140).

Referring to the FIG. 3, consider the UE (100) is generally ENDC capable which is capable of providing active services on both the first SIM (130) and the second SIM (140). Consider a scenario where the voice call is not active on both the first SIM (130) and the second SIM (140), then the T1 (110) is used by the first SIM (130) and the T2 (120) is used by the second SIM (140).

Consider another scenario where the split bearer is activated on the first SIM (130), then the UE (100) configures the T1 (110) and the T2 (120) to the first SIM (130).

Consider another scenario where the voice call on the first SIM (130) is activated, then the T1 (110) will be used by the first SIM (130) for the voice call and the T2 (120) will be used by the second SIM (140).

Consider another scenario where the split bearer is activated on the second SIM (140), then the UE (100) configures the T1 (110) and the T2 (120) to the second SIM (140).

FIG. 4A illustrates that the ENDC capable UE (100) is not able to provide the voice call on the first SIM (130) and the data services on the second SIM (140) simultaneously, according to a prior art.

Referring to the FIG. 4A, at step 1, consider that the UE (100) registers the first SIM (110) to the first network (1100) in the dual connectivity with NR supported mode using the T1 (130) and the second SIM (120) to the second network (1200) in the dual connectivity with NR not supported using the T2 (140). Further, the first network (1100) configures the split bearer based on the ENDC capability. At step 2, the first network (1100) is using both the T1 (110) and the T2 (120) i.e., the T2 (120) for sending the 5G data and the T2 (120) for sending the 4G data. Further, the T1 (110) is shared by the second network (1300) and the first network (1100), since the second SIM (120) is in the idle mode. At step 3, consider a high priority event occurs on the second SIM (120) such as the voice call, which changes the status of the second SIM (120) from the idle mode to the connect mode. Since the high priority event is happening on the second SIM (140), the second network (1200) is using the T2 (120) for the high priority event and the first network (1100) is not providing any service using the T1 (130) and the first SIM (130) is inactive i.e., the first SIM (130) cannot not provide at least one of the 5G data and the 4G data. Therefore, in the conventional methods and systems, there exists no mechanism by which the first SIM (130) can be allowed to provide services when the high priority event occurs on the second SIM (140).

FIG. 4B illustrates a mechanism by which the UE (100) provides services on both the first SIM (130) and second SIM (140) simultaneously, according to an embodiment as disclosed herein. Referring to the FIG. 4B, in conjunction with the FIG. 4A, the step 1 and step 2 may be repetitive and hence avoided rewriting the same. At step 3, according to the proposed methods and systems, the second network (1200) uses the T2 (120) for accommodating the high priority event and the first network (1100) is uses the (110) for providing the 4G data. Therefore, unlike to the conventional methods and systems, in the proposed embodiment the first SIM (130) and the second SIM (140) are simultaneously active.

FIG. 4C is a signaling diagram illustrating a method for configuring the second SIM (120) to provide the voice call over the T2 (140) and the first SIM (110) to provide the data services over the T1 (130) by disabling the 5G bearer by sending the Tracking Area Update (TAU) message to the first network (1300), according to an embodiment as disclosed herein.

Consider the UE (100) which is ENDC capable on the first SIM (110) and supports 4G on the second SIM (120).

Referring to FIG. 4C, at step 401a, the UE (100) registers the first SIM (130) to first network (1100) which is a LTE network in a Dual Connectivity with NR (DCNR) supported mode using the T1 (110) by sending an attach request message to the first network (1100). In the attach request message, a UE network capability IE bit is set to "dual connectivity with NR supported". At step 402a, the UE (100) registers the second SIM (120) to the second network (1500) in the Dual Connectivity with NR (DCNR) NOT supported mode using the T2 (140) by sending the attach request message to the second network (1500). In the attach request message, the UE network capability IE bit is set to "dual connectivity with NR NOT supported".

At step 403a, since the "dual connectivity with NR supported" bit is set, the first SIM (110) is capable of operating on both the T1 (130) and the T2 (140) through a split bearer. The 4G bearer and the 5G bearer are configured by the first network (1300) on the first SIM (110) i.e., the 4G bearer is established on the T1 (130) and 5G bearer is established on T2 (140) of the UE (100). Further, at step 404a, the UE (100) detects an event such as a voice call is initiated at the second SIM (120) and the voice call is one of a mobile originated (MO) and a mobile terminated (MT) call. At 405a, the UE (100) transmits a Tracking Area Update (TAU) message to the first network (1300) by setting the DCNR bit to "Dual Connectivity with NR not supported" in the TAU message. In response to the TAU message which indicates the "Dual Connectivity with NR not supported", the 5G capabilities between the UE (100) and the first network (1300) is disabled by the first network (1300). At 406a, the disabling of the 5G capabilities between the UE (100) and the first network (1300) is caused by releasing the 5G bearer by the first network (1300) from the T2 (140) of the UE (100).

Further, the voice call is accommodated on the T2 (140) by the second SIM (120) and the T1 (130) is used by the first SIM (110) for transmitting the 4G data. At 407a, the UE (100) detects that the voice call is ended at the second SIM (120). At 408a, the UE (100) indicates the first network (1100) to enable the 5G capabilities on the first SIM by sending the TAU message to the first network (1100) where the UE network capability IE bit is set to "dual connectivity with NR supported". At 409a, the T1 (130) and the T2 (140) is allocated to the split bearers of the first network (1300). The first SIM (110) can use both the T1 (130) and the T2 (140) for the split bearers.

FIG. 4D is a signaling diagram illustrating a method for configuring the second SIM (120) to provide the voice call over the T2 (140) and the first SIM (110) to provide the data services over the T1 (130) by disabling the 5G bearer by sending a Non-Access Stratum (NAS) message to the first network (1300), according to an embodiment as disclosed herein.

Referring to the FIG. 4D in conjunction with the FIG. 4C, the steps 401b to 404b may be substantially the same as steps 401a to 404a, and may be repetitive and, thus repeated description is omitted.

At 405b, the UE (100) transmits the Non-Access Stratum (NAS) message to the first network (1300) by setting the DCNR bit to "Dual Connectivity with NR not supported" in the NAS message. In response to the NAS message which indicates the "Dual Connectivity with NR not supported", the 5G capabilities between the UE (100) and the first network (1300) is disabled by the first network (1300). At 406b, the disabling of the 5G capabilities between the UE (100) and the first network (1300) is caused by releasing the 5G bearer by the first network (1300) from the T2 (140) of the UE (100).

Further, the voice call is accommodated on the T2 (140) by the second SIM (120) and the T1 (130) is used by the first SIM (110) for transmitting the 4G data. At 407b, the UE (100) detects that the voice call is ended at the second SIM (120). At 408b, the UE (100) indicates the first network (1100) to enable the 5G capabilities on the first SIM by sending the TAU message to the first network (1100) where the UE network capability IE bit is set to "dual connectivity with NR supported". At 409b, the T1 (130) and the T2 (140) is allocated to the split bearers of the first network (1300). The first SIM (110) can use both the T1 (130) and the T2 (140) for the split bearers.

FIG. 4E is a signaling diagram illustrating a method for configuring the second SIM (120) to provide the voice call over the T2 (140) and the first SIM (110) to provide the data services over the T1 (130) by disabling the 5G bearer and the 4G bearer by sending an extended service request message, according to an embodiment as disclosed herein.

Referring to the FIG. 4E in conjunction with the FIG. 4C, the steps 401c to 404c may be substantially the same as steps 401a to 404a, and may be repetitive and, thus repeated description is omitted. At step 404b, the UE (100) detects the voice call is initiated at the second SIM (120) which is one of the mobile originated (MO) and the mobile terminated (MT) call. At 405c, the UE (100) sends the extended service request message to the first network (1300). At step 406c, the first network (1300) in response to the extended service request message sent by the UE (100) releases the 5G bearer established between the first network (1300) and the first SIM (110) on the T2 (140) and the 4G bearer established between the first network (1300) and the first SIM (110) on the T1 (130) and moves the UE (100) to the idle mode. Further, the voice call is accommodated on the T2 (140) by the second SIM (120) and the T1 (130) is used by the first SIM (110) for transmitting the 4G data.

At 407c, the UE (100) sends the first Tracking Area Update (TAU) message to the first network (1300) by setting the DCNR bit to "dual connectivity with NR not supported" mode to disable the NR. At step 408c, the UE (100) sends the indication to the first network (1300) to establish the 4G bearer between the first network (1300) and the first SIM (110) on the T1 (130) to provide the data service.

Further, at step 409c, the UE (100) determines that the voice call on the second SIM (120) is ended and at step 410c, the UE (100) sends the second TAU message to the first network (1300) to establish the 5G bearer between the first network (1300) and the first SIM (110) on the T2 (140) by setting the DCNR bit to "dual connectivity with NR supported" mode. The second TAU message enables the 5G capabilities on the first SIM (110). At 411c, the T1 (130) and the T2 (140) are allocated to the split bearers of the first network (1300). The first SIM (110) can use both the T1 (130) and the T2 (140) for the split bearers.

FIG. 4F is a signaling diagram illustrating a method for configuring the second SIM (120) to provide the voice call over the T2 (140) and the first SIM (110) to provide the data services over the T1 (130) by initiating the Secondary Cell Group Radio Link Failure (SCG RLF) on the T2 (140), according to an embodiment as disclosed herein.

Referring to the FIG. 4F in conjunction with the FIG. 4C, the steps 40dc to 40dc may be substantially the same as steps 401a to 404a, and may be repetitive and, thus repeated description is omitted. At step 404d, the UE (100) detects the voice call is initiated at the second SIM (120) which is one of the mobile originated (MO) and the mobile terminated (MT) call. At step 405d, the UE (100) initiates the Secondary Cell Group Radio Link Failure (SCG RLF) on the T2 (140) and determines that the 5G bearer established between the first network (1300) and the first SIM (110) on the T2 (140) is released by the first network (1300) in response to the SCG RLF. The SCG RLF releases the 5G bearer established between the first network (1300) and the first SIM (110) on the T2 (140) locally. At step 406d, the UE (100) suspend the measurement report for NR cells to be sent to the first network (1300). At step 407d, the UE (100) rejects any blind reconfiguration attempted by the first network (1300). At step 408d, the UE (100) sends the indication to the first network (1300) to establish the 4G bearer between the first network (1300) and the first SIM (110) on the T1 (130) to provide the data service.

At step 409d, the UE (100) determines that the voice call on the second SIM (120) is ended and at step 410d, the UE (100) resumes the measurement report for the NR cells. Further, at step 411d, the T1 (130) and the T2 (140) are allocated to the split bearers of the first network (1300). The first SIM (110) can use both the T1 (130) and the T2 (140) for the split bearers.

FIG. 5A illustrates an existing mechanism in the UE (100) with the ENDC capability which is operating in a dual SIM configuration, according to prior art.

Consider that the UE (100) is ENDC capable dual SIM device with the first SIM (110) and the second SIM (120). Consider that the default data subscription (DDS) is activated on the second SIM (120).

Referring to the FIG. 5A, at 1, the UE (100) latches to the first network (1300) using the first SIM (110) through the T1 (130) and to the second network (1500) using the second SIM (120) through the T2 (140). At 2, based on the mechanism for providing services simultaneously on the first SIM (110) and the second SIM (120), as explained in FIG. 2A, the video call is activated on the first SIM (110) over the 4G bearer of the T1 (130) and the data session is active on the second SIM (120) over the T2 (140), simultaneously.

At 3, consider that the data session on the second SIM (120) is one of: ended and the data is turned off on the second SIM (120). Operating the video call on the 5G bearer provides higher bit rate. However, there exists no mechanism for the UE (100) to provide the video call on the 5G bearer in the ENDC mode on the first SIM (110) even when the T2 (140) is free as the data session on the T2 (140) is ended.

FIG. 5B illustrates a mechanism in the UE (100) with the ENDC capability for providing the video call on the 5G bearer, while operating in the dual SIM configuration, according to an embodiment as disclosed herein.

Referring to the FIG. 5B, in conjunction with the FIG. 5A, the steps 1 to 2 in the FIG. 5B may be substantially the same as steps 1 to 2 of the FIG. 5A, and, thus repeated description is omitted. At 3, when the data session on the second SIM (120) is one of: ended and the data is turned off on the second SIM (120), the video call is shifted to the 5G bearer. Hence, when high speed data is transferred on the first SIM (110) i.e., data session, the UE (100) indicates the EN-DC mode on the first SIM (110). If the video call is initiated on the second SIM (120) and needs the 5G bearer then the EN-DC capability is indicated on the second SIM (120) and is disabled on the first SIM (110).

Therefore, in the proposed mechanism the EN-DC capability can be indicated on one of the first SIM (110) and the second SIM (120) and can be changed dynamically based on a use case.

FIG. 5C is a signaling diagram illustrating mechanism in the UE (100) with the ENDC capability for providing the video call on the 5G bearer, while operating in the dual SIM configuration, according to an embodiment as disclosed herein.

Referring to the FIG. 5C, at step 501, the UE (100) registers the first SIM (110) to the first network (1300) in the Dual Connectivity with NR (DCNR) not supported mode using the T1 (130). At step 502, the UE (100) registers the second SIM (120) to the second network (1500) in the Dual Connectivity with NR (DCNR) supported mode using the T2 (140).

At step 503, the UE (100) determines that the data session is initiated on the second SIM (120) using the T2 (140). Further, at step 504, the UE (100) determines that the video call is initiated on the first SIM (110) using the T1 (130).

At step 505, the UE (100) determines one of: the data session is ended, a RRC connection is released by the second network (1500), a mobile data is turned off on the second SIM (120) resulting in the second SIM (120) going to idle status.

At step 506, the UE (100) sends the first TAU message to the second network (1500) with the DCNR bit set to the DCNR not supported mode. The first TAU message indicates to the second network (1500) to disable the 5G bearer established between the second SIM (120) and the second network (1500). Further, at step 506, the UE (100) sends the second TAU message to the first network (1300) with the DCNR bit set to the DCNR supported mode. The second TAU message indicates to the first network (1300) to enable the 5G bearer between the first SIM (110) and the first network (1300).

At step 508, the UE (100) configures the first SIM (110) to provide: a 5G video over the T1 (130) and the 4G service/LTE over the T2 (140).

At step 509, the UE (100) sends the IMS signaling to the IMS server of the first SIM (110) indicating to upgrade a bit rate of the video call by shifting the video call over the 5G bearer. However, the voice still continues to be ongoing over the first network (1300).

At step 510, the IMS server of the first SIM (110) sends the indication to the first network (1300) to upgrade the ongoing video call to the NR/5G bearer.

At step 511, the UE (100) receives the indication from the first network (1300) to upgrade the ongoing video call to the NR/5G bearer. Thus the LTE video Call is thus upgraded to work on the 5G bearer.

FIG. 6A illustrates a mechanism in the UE with the ENDC capability for providing the data session on the T1 (130) and the video call on the T2 (140) with single uplink (SUL) configuration, according to an embodiment as disclosed herein.

Referring to the FIG. 6A, consider that the UE (100) latches to the first network (1300) using the first SIM (110)

through the T1 (130) and to the second network (1500) using the second SIM (120) through the T2 (140). Also, consider that the single uplink (SUL) configuration is activated on both the first SIM (110) and the second SIM (120). In the Single Uplink Transmission configuration, a single transceiver can be used for transmission to multiple receivers while operating in a specific band of frequency IE in RF, Physical layer parameters, points to TS 38.101-3, and there, the relevant table contains a "Single UL allowed" column. indicates that the UE does not support simultaneous UL transmissions as defined in TS 38.101-3. The UE may only set this bit for certain band combinations as defined in TS 38.101-3. The standard use of 5G EN-DC described in 3GPP requires simultaneous transmission and reception of LTE and NR signals by the UE. To mitigate the self-interference issue, 3GPP has specified which band combinations are allowed to stray from the stringent requirement for simultaneous operation. (E.g. Band 3+n78 (that's 1.8 GHz for LTE and 3.x GHz for NR) can only operate in Single Uplink Transmission).

At 2, based on the mechanism for providing services simultaneously on the first SIM (110) and the second SIM (120), as explained in FIG. 2A, the video call is initiated on the second SIM (120) and the data session is activated on the first SIM (110) simultaneously. However, even though the SUL configuration is activated on both the first SIM (110) and the second SIM (120), no 5G data or 5G video is transmitted on the first SIM (110) and the second SIM (120) respectively. FIG. 6B illustrates a mechanism in the UE (100) with the ENDC capability for providing a 5G data on the first SIM (110) and a 5G video call on the second SIM (120) when the single uplink (SUL) configuration is enabled on the first SIM (110) and the second SIM (120), according to an embodiment as disclosed herein.

Referring to the FIG. 6B, in conjunction with the FIG. 6A, the step 1 in the FIG. 6B may be substantially the same as step 1 of the FIG. 6A, and, thus repeated description is omitted.

At 2, the video call is initiated on the second SIM (120) and the data session is activated on the first SIM (110) simultaneously. Since, the SUL configuration is activated on both the first SIM (110) and the second SIM (120), in the proposed method, the 5G data is provided on the first SIM (110) along with the data session and the 5G video call is provided on the second SIM (120) along with the video call. Therefore, in the proposed method, both the first SIM (110) and the second SIM (120) can be used to provide the 5G data session and the 5G video call simultaneously when the SUL configuration is activated on both the first SIM (110) and the second SIM (120).

FIG. 6C is a signaling diagram illustrating the mechanism of the UE (100) to provide the 5G data on the first SIM (110) and the 5G video call on the second SIM (120) when the single uplink (SUL) configuration is enabled on the first SIM (110) and the second SIM (120), according to an embodiment as disclosed herein.

Referring to the FIG. 6C, at step 601a, the UE (100) determines a default data subscription (DDS) is set on the first SIM (110) and determines that the first SIM (110) is camped on a LTE band which is configured for a Single UL Transmission (SUL). Further, the UE (100) registers the first SIM (110) to the LTE network in the DCNR bit to "dual connectivity with NR supported" mode on the T2 (140). The UE (100) also determines that the second SIM (120) is camped on the LTE band which is configured for the SUL and registers the second SIM (120) to the LTE network in the DCNR bit to "dual connectivity with NR supported" mode on the first transceiver (130).

At step 602a, the UE (100) sends a RRC reconfiguration message for the 5G bearer to the second network (1500).

At step 603a, the UE (100) determines that the LTE-NR DC band combination is configured for a SUL operation as per TS 38.101-3 3GPP spec and one of the UE (100) and the LTE network supports the LTE-NR DC band combination. Further, the UE (100) initiates the data session on the 4G bearer and the 5G bearer using the single transceiver if the LTE-NR DC is configured for the SUL operation and is supported by one of the UE (100) and the LTE network.

At step 604a, the UE (100) determines if the second SIM (120) is configured with the LTE band with the SUL enabled as per TS 38.101-3 of 3GPP spec and the SUL is supported on one of the UE (100) and the LTE network. In response to determining that the second SIM (120) is configured with the LTE band with the SUL enabled and the SUL is supported on one of the UE (100) and the LTE network, the UE (100) triggers the registration (DCNR supported) to the second network (1500).

At step 605a, the UE (100) sends the RRC Reconfiguration message for NR frequency configuration to the first network (1300).

At step 606a, the UE (100) determines whether the LTE-NR ENDC combination is configured for the SUL as per TS 38.101-3 of 3GPP spec and one of the UE (100) and the LTE network supports the SUL on the LTE-NR ENDC combination based on a NR frequency configuration in a RRC Reconfiguration Message and initiates the video call on the first SIM (110) using the second transceiver (140) and enables the video call on the second SIM (120) using the SUL operation for the 5G video packets using one of the split bearer with the 4G or the SCG bearer.

FIG. 6D is a signaling diagram illustrating the mechanism of the UE (100) to provide the voice/video call on the 4G bearer when the single uplink (SUL) configuration is enabled on the first SIM (110) and the second SIM (120), according to an embodiment as disclosed herein.

Referring to the FIG. 6D, in conjunction to the FIG. 6C the steps 601b to 605b may be substantially the same as steps 601a to 605a, and, thus repeated description is omitted.

At step 606b, the UE (100) determines that the LTE-NR ENDC combination is not configured for the SUL as per TS 38.101-3 of 3GPP spec and one of the UE (100) and the LTE network does not support the SUL on the LTE-NR ENDC combination based on the NR frequency configuration in the RRC Reconfiguration message. Further, at step 607b, in response to determining that the LTE-NR ENDC combination is not configured for the SUL as per TS 38.101-3 of 3GPP spec and one of the UE (100) and the LTE network does not support the SUL on the LTE-NR ENDC combination, the UE (100) initiates one of the video call and the voice call on the second SIM (120) using the second transceiver (140) on the 4G bearer without the UE (100) NR. FIG. 7A illustrates a mechanism of the UE (100) with the ENDC capability for switching the default data subscription (DDS) from the first SIM (110) to the second SIM (120), according to an embodiment as disclosed herein.

Referring to the FIG. 7A, at 1 consider that the UE (100) latches to the first network (1300) using the first SIM (110) through the T1 (130) and to the second network (1500) using the second SIM (120) through the T2 (140). Also, consider that the DDS is activated on the first SIM (110). In the conventional methods and systems, at 2, a procedure to switch the DDS from one SIM to the other SIM is a time taking process. The procedure to switch the DDS from one SIM to the other SIM includes disabling by the UE (100) the ENDC capability on the first SIM (110), disabling by the UE (100) the DDS from the first SIM (110), enabling by the UE (100) the ENDC capability on the second SIM (120) and then enabling by the UE (100) the DDS on the second SIM (120).

FIG. 7B illustrates a mechanism of the UE (100) with the ENDC capability for switching the DDS from the first SIM (110) to the second SIM (120) to provide 5G services on the first SIM (110) and the second SIM (120), according to an embodiment as disclosed herein.

Referring to the FIG. 7B, in conjunction with the FIG. 7A, the step 1 in the FIG. 7B may be substantially the same as step 1 of the FIG. 7A, and, thus repeated description is omitted.

At 2, in the proposed method, the UE (100) registers the first SIM (110) and the second SIM (120) with the 5G capability. However, the first SIM (110) and the second SIM (120) uses the 5G capability only when a requirement arises. Therefore, the switching of the DDS happens locally between the first SIM (110) and the second SIM (120) which saves substantial amount of time.

FIG. 7C is a signalling diagram for the mechanism of the UE (100) with the ENDC capability for switching the DDS from the first SIM (110) to the second SIM (120) to provide the 5G services on the first SIM (110) and the second SIM (120), according to an embodiment as disclosed herein.

Referring to the FIG. 7C, at step 701, the UE (100) registers the first SIM (110) using the T1 (130) to the first network (1300) (the first network (1300) is LTE network) by setting the DCNR bit to "Dual connectivity with NR supported" in the UE network capability IE of the attach request message capability bit.

At 702, since the "dual connectivity with NR supported" bit is set, the first SIM (110) is capable of operating on both the T1 (130) and the T2 (140) through the split bearer. The 4G bearer and the 5G bearer are configured by the first network (1300) on the first SIM (110) i.e., the 4G bearer is established on the T1 (130) and 5G bearer is established on T2 (140) of the UE (100).

At step 703, the UE (100) registers the second SIM (120) using the T2 (140) to the second network (1500) by setting the DCNR bit to "Dual connectivity with NR supported" in the UE network capability IE of the attach request message capability bit.

At step 704, the UE (100) suspends measurement report for NR cells to be sent by the second SIM (120) to the second network (1500) until the DDS is enabled on the first SIM (110).

At step 705, the UE (100) determines that the second network (1500) performs the blind reconfiguration for the 5G connectivity on the second SIM (120). Further, the UE (100) rejects the configuration message.

At step 706, the UE (100) determines that a LTE service is required and sends the indication to the second network (1500) to establish the 4G bearer between the second network (1500) and the second SIM (120) on the T2 (140) for providing the LTE service.

At step 707, the UE (100) determines that the DDS is switched from the first SIM (110) to the second SIM (120).

At step 708, the UE (100) in response to determining that the DDS is switched from the first SIM (110) to the second SIM (120), resumes the transmission of the measurement report for the NR cells on the second SIM (120) and at step 709 configures the second SIM (120) to provide: 5G service over the T1 (130) and 4G service over the T2 (140).

At step 710, the UE (100) suspends the measurement report for the NR cells to be sent to the first network (1300) as the DDS is now enabled on the second SIM (120).

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for providing a voice call and a data service in an Evolved-Universal Terrestrial Radio Access Network New Radio-Dual Connectivity (EN-DC) capable User Equipment (UE) supporting a plurality of Subscriber identity modules (SIMs), the method comprising:
    registering a first SIM of the plurality of SIMs to a first network in a Dual Connectivity with NR (DCNR) supported mode using a first transceiver;
    registering a second SIM of the plurality of SIMs to a second network in a Dual Connectivity with NR (DCNR) not supported mode using a second transceiver;
    determining a split bearer established by the first SIM, wherein the split bearer establishment comprises a 4G bearer established on the first transceiver and a 5G bearer established on the second transceiver by the first network using the first SIM;
    determining the voice call is initiated on the second SIM when the data service is active on the first SIM through the first transceiver and the second transceiver; and
    configuring the second SIM to provide the voice call over the second transceiver and the first SIM to provide the data services over the first transceiver simultaneously.

2. The method of claim 1, wherein configuring the second SIM to provide the voice call over the second transceiver and the first SIM to provide the data service over the first transceiver comprising comprises:
    sending a first Tracking Area Update (TAU) message to the first network to disable the 5G bearer established between the first network and the first SIM on the second transceiver, by setting a DCNR bit to "dual connectivity with NR not supported" mode;
    determining that the 5G bearer established between the first network and the first SIM on the second transceiver is released by the first network, in response to the first TAU message; and
    configuring the second SIM to provide the voice call over the second transceiver and the first SIM to provide the data service over the first transceiver.

3. The method of claim 1, wherein configuring the second SIM to provide the voice call over the second transceiver and the first SIM to provide the data service over the first transceiver comprises:

sending a Non-Access Stratum (NAS) message to the first network to disable the 5G bearer established between the first network and the first SIM on the second transceiver, by setting a DCNR bit to "dual connectivity with NR not supported" mode;

determining that the 5G bearer established between the first network and the first SIM on the second transceiver is released by the first network, in response to the NAS message; and configuring the second SIM to provide the voice call over the second transceiver and the first SIM to provide the data service over the first transceiver.

4. The method of claim 1, wherein configuring the second SIM to provide the voice call over the second transceiver and the first SIM to provide the data service over the first transceiver comprises:

sending an extended service request message to the first network to release the 5G bearer established between the first network and the first SIM on the second transceiver and the 4G bearer established between the first network and the first SIM on the first transceiver, wherein the extended service request message to the first network moves the UE to an idle mode;

sending a first Tracking Area Update (TAU) message to the first network by setting a DCNR bit to "dual connectivity with NR not supported" mode to disable the NR;

sending an indication to the first network to establish the 4G bearer between the first network and the first SIM on the first transceiver based on a data session, wherein the 4G bearer is used to provide the data service; and configuring the second SIM provide the voice call over the second transceiver and the first SIM to provide the data service over the first transceiver.

5. The method of claim 1, wherein configuring the second SIM to provide the voice call over the second transceiver and the first SIM to provide the data service over the first transceiver comprises:

initiating a Secondary Cell Group Radio Link Failure (SCG RLF) on the second transceiver;

determining that the 5G bearer established between the first network and the first SIM on the second transceiver is released by the first network, in response to the SCG RLF;

suspending a measurement report for NR cells to be sent to the first network; and configuring the second SIM to provide the voice call over the second transceiver and the first SIM to provide the data service over the first transceiver.

6. The method of claim 1, further comprising:

determining that a data session is initiated on the first SIM using the first transceiver;

determining that a video call is initiated on the second SIM using the second transceiver;

determining one of: the data session is ended, an RRC connection is released by the first network, or a mobile data is turned off on the first SIM;

sending a first TAU message on the first network with a DCNR bit set to the DCNR not supported mode, wherein the first TAU message indicates to the first network to disable a 5G capability between the first SIM and the first network;

sending a second TAU message to the second network with the DCNR bit set to the DCNR supported mode, wherein the second TAU message indicates to the second network to enable the 5G capability between the second SIM and the second network;

sending an IMS signaling to the second network indicating to upgrade a bit rate of the video call by shifting the video call over the 5G bearer; and configuring the second SIM to provide video packets over the first transceiver on the 5G bearer and the second transceiver on the 4G bearer and voice packets over the second transceiver on the 4G bearer.

7. The method of claim 1, further comprising:

determining a default data subscription (DDS) is set on the first SIM;

determining the first SIM is camped on an LTE band that is configured for a Single UL Transmission (SUL);

registering the first SIM to an LTE network in a DCNR bit to "dual connectivity with NR supported" mode on the second transceiver;

determining an LTE-NR DC band combination is configured for a SUL operation as per TS 38.101-3 of 3GPP spec and one of the UE or the LTE network supports the LTE-NR DC band combination;

initiating a data session on the first SIM using the first transceiver on the first SIM using the SUL operation for 5G Data Packets using one of a split bearer or a Secondary Cell Group (SCG) bearer;

determining the second SIM is camped on the LTE band that is configured for the SUL;

registering the second SIM to the LTE network in the DCNR bit to "dual connectivity with NR supported" mode on the first transceiver;

determining whether an LTE-NR ENDC combination is configured for the SUL as per TS 38.101-3 of 3GPP spec and one of the UE or the LTE network supports the SUL on the LTE-NR ENDC combination based on a NR frequency configuration in a RRC Reconfiguration Message;

initiating a video call on the second SIM using the second transceiver; and enabling the video call on the second SIM using a SUL operation for 5G video packets using one of the split bearer with the 4G bearer or the SCG bearer.

8. The method of claim 1, further comprising:

determining a default data subscription (DDS) is set on the first SIM;

determining the first SIM is camped on an LTE band which is configured for a Single Uplink (SUL) by 3GPP and supported by both the UE and an LTE network;

registering the first SIM to the LTE network in a DCNR bit to "dual connectivity with NR supported" mode on the second transceiver;

determining an LTE-NR DC band combination is configured for SUL Operation as per 3GPP and supported by both the UE and the LTE network;

initiating a data session on the first SIM using the first transceiver on the first SIM using the SUL operation for 5G Data Packets using one of a split bearer or a SCG bearer;

determining the second SIM is camped on the LTE band that is configured for the SUL;

registering the second SIM to the LTE network in the DCNR bit to "dual connectivity with NR supported" mode on the first transceiver;

determining one of an LTE-NR ENDC combination is not configured for the SUL as per TS 38.101-3 of 3GPP spec and one of the UE or the LTE network does not support the SUL on the LTE-NR ENDC combination based on a NR frequency configuration in a RRC Reconfiguration message; and initiating one of a video call or the voice call on the second SIM using the second transceiver on the 4G bearer without the NR.

9. The method of claim 1, further comprising:
determining that default data subscription (DDS) is activated on the first SIM;
enabling the NR on the first SIM and the second SIM;
configuring the data service on the first SIM using the 4G bearer on the first transceiver and the 5G bearer using a split bearer configuration on the second transceiver;
suspending a measurement report for NR cells to be sent to the second network on the second SIM;
determining that the DDS is switched to the second SIM from the first SIM;
initiating a Secondary Cell Group Radio Link Failure (SCG RLF) on the first SIM;
determining the 5G bearer established between the first network and the first SIM on the second transceiver is released by the first network in response to the SCG RLF;
resuming a transmission of the measurement report for the NR cells on the second SIM;
configuring the second SIM to provide data service on the 5G bearer over the first transceiver and the 4G bearer over the second transceiver based on an NR addition by the first network; and
suspending the measurement report for the NR cells to be sent to the second network corresponding to the first SIM.

10. The method of claim 1, wherein an EN-DC capability is indicated on at least one of the first SIM or the second SIM,
wherein the EN-DC capability on at least one of the first SIM or the second SIM is changed based on an event associated with one of the first SIM and the second SIM, and
wherein the event is one of: the voice call, the data service, or a video call.

11. An apparatus for Evolved-Universal Terrestrial Radio Access Network New Radio-Dual Connectivity (EN-DC) capable User Equipment (UE) supporting a plurality of Subscriber identity modules (SIMs) for providing a voice call and a data service, comprising:
a memory; and
a processor coupled to the memory and configured to:
register a first SIM of the plurality of SIMs to a first network in a Dual Connectivity with NR (DCNR) supported mode using a first transceiver;
register a second SIM of the plurality of SIMs to a second network in a Dual Connectivity with NR (DCNR) not supported mode using a second transceiver;
determine a split bearer established by the first SIM, wherein the split bearer establishment comprises a 4G bearer is established on the first transceiver and a 5G bearer is established on the second transceiver by the first network using the first SIM;
determine the voice call is being initiated on the second SIM when the data service is active on the first SIM through the first transceiver and the second transceiver; and
configure the second SIM to provide the voice call over the second transceiver and the first SIM to provide the data services over the first transceiver simultaneously.

12. The apparatus of claim 11, wherein the processor, in order to configure the second SIM to provide the voice call over the second transceiver and the first SIM to provide the data service over the first transceiver, is further configured to:
send a first Tracking Area Update (TAU) message to the first network to disable the 5G bearer established between the first network and the first SIM on the second transceiver, by setting a DCNR bit to "dual connectivity with NR not supported" mode;
determine that the 5G bearer established between the first network and the first SIM on the second transceiver is released by the first network, in response to the first TAU message; and
configure the second SIM to provide the voice call over the second transceiver and the first SIM to provide the data service over the first transceiver.

13. The apparatus of claim 11, wherein the processor, in order to configure the second SIM to provide the voice call over the second transceiver and the first SIM to provide the data service over the first transceiver, is further configured to:
send a Non-Access Stratum (NAS) message to the first network to disable the 5G bearer established between the first network and the first SIM on the second transceiver, by setting a DCNR bit to "dual connectivity with NR not supported" mode;
determine that the 5G bearer established between the first network and the first SIM on the second transceiver is released by the first network, in response to the NAS message; and
configure the second SIM to provide the voice call over the second transceiver and the first SIM to provide the data service over the first transceiver.

14. The apparatus of claim 11, wherein the processor, in order to configure the second SIM to provide the voice call over the second transceiver and the first SIM to provide the data service over the first transceiver, is further configured to:
send an extended service request message to the first network to release the 5G bearer established between the first network and the first SIM on the second transceiver and the 4G bearer established between the first network and the first SIM on the first transceiver, wherein the extended service request message to the first network moves the UE to an idle mode;
send a first Tracking Area Update (TAU) message to the first network by setting a DCNR bit to "dual connectivity with NR not supported" mode to disable the NR;
send an indication to the first network to establish the 4G bearer between the first network and the first SIM on the first transceiver based on a data session, wherein the 4G bearer is used to provide the data service; and
configure the second SIM to provide the voice call over the second transceiver and the first SIM to provide the data service over the first transceiver.

15. The apparatus of claim 11, wherein the processor, in order to configure the second SIM to provide the voice call over the second transceiver and the first SIM to provide the data service over the first transceiver, is further configured to:
initiate a Secondary Cell Group Radio Link Failure (SCG RLF) on the second transceiver;

determine that the 5G bearer established between the first network and the first SIM on the second transceiver is released by the first network, in response to the SCG RLF;

suspend a measurement report for NR cells to be sent to the first network; and configure the second SIM to provide the voice call over the second transceiver and the first SIM to provide the data service over the first transceiver.

16. The apparatus of claim 11, wherein the processor is further configured to:

determine that a data session is initiated on the first SIM using the first transceiver;

determine that a video call is initiated on the second SIM using the second transceiver;

determine one of: the data session is ended, an RRC connection is released by the first network, or a mobile data is turned off on the first SIM;

send a first TAU message on the first network with a DCNR bit set to the DCNR not supported mode, wherein the first TAU message indicates to the first network to disable a 5G capability between the first SIM and the first network;

send a second TAU message to the second network with a DCNR bit set to the DCNR supported mode, wherein the second TAU message indicates to the second network to enable the 5G capability between the second SIM and the second network;

send an IMS signaling to the second network indicating to upgrade a bit rate of the video call by shifting the video call over the 5G bearer; and configure the second SIM to provide video packets over the first transceiver on the 5G bearer and the second transceiver on the 4G bearer and voice packets over the second transceiver on the 4G bearer.

17. The apparatus of claim 11, wherein the processor is further configured to:

determine a default data subscription (DDS) is set on the first SIM;

determine the first SIM is camped on an LTE band which is configured for a Single UL Transmission (SUL);

register the first SIM to an LTE network in a DCNR bit to "dual connectivity with NR supported" mode on the second transceiver;

determine an LTE-NR DC band combination is configured for a SUL operation as per TS 38.101-3 of 3GPP spec and one of the UE or the LTE network supports the LTE-NR DC band combination;

initiating a data session on the first SIM using the first transceiver on the first SIM using the SUL operation for 5G Data Packets using one of a split bearer or a Secondary Cell Group (SCG) bearer;

determine the second SIM is camped on the LTE band that is configured for the SUL;

register the second SIM to the LTE network in the DCNR bit to "dual connectivity with NR supported" mode on the first transceiver;

determine whether an LTE-NR ENDC combination is configured for the SUL as per TS 38.101-3 of 3GPP spec and one of the UE and or the LTE network supports the SUL on the LTE-NR ENDC combination based on a NR frequency configuration in a RRC Reconfiguration Message;

initiate a video call on the second SIM using the second transceiver; and enable the video call on the second SIM using a SUL operation for 5G video packets using one of the split bearer with the 4G bearer or the SCG bearer.

18. The apparatus of claim 11, wherein the processor is further configured to:

determine a default data subscription (DDS) is set on the first SIM;

determine the first SIM is camped on an LTE band which is configured for a Single Uplink (SUL) by 3GPP and supported by both the UE or an LTE network;

register the first SIM to the LTE network in a DCNR bit to "dual connectivity with NR supported" mode on the second transceiver;

determine an LTE-NR DC band combination is configured for SUL Operation as per 3GPP and supported by both the UE and the LTE network;

initiate a data session on the first SIM using the first transceiver on the first SIM using the SUL operation for 5G Data Packets using one of a split bearer or a SCG bearer;

determine the second SIM is camped on the LTE band that is configured for the SUL;

register the second SIM to the LTE network in the DCNR bit to "dual connectivity with NR supported" mode on the first transceiver;

determine one of an LTE-NR ENDC combination is not configured for the SUL as per TS 38.101-3 of 3GPP spec and one of the UE or the LTE network does not support the SUL on the LTE-NR ENDC combination based on a NR frequency configuration in a RRC Reconfiguration message; and initiate one of a video call or the voice call on the second SIM using the second transceiver on the 4G bearer without the NR.

19. The apparatus of claim 11, wherein the processor is further configured to:

determine that default data subscription (DDS) is activated on the first SIM;

enable the NR on the first SIM and the second SIM;

configure the data service on the first SIM using the 4G bearer on the first transceiver and the 5G bearer using a split bearer configuration on the second transceiver;

suspend a measurement report for NR cells to be sent to the second network on the second SIM;

determine that the DDS is switched to the second SIM from the first SIM;

initiate a Secondary Cell Group Radio Link Failure (SCG RLF) on the first SIM;

determine the 5G bearer established between the first network and the first SIM on the second transceiver is released by the first network in response to the SCG RLF;

resume a transmission of the measurement report for the NR cells on the second SIM;

configure the second SIM to provide data service on the 5G bearer over the first transceiver and the 4G bearer over the second transceiver based on an NR addition by the first network; and suspend the measurement report for the NR cells to be sent to the second network corresponding to the first SIM.

20. The apparatus of claim 11, wherein an EN-DC capability is indicated on at least one of the first SIM and the second SIM, wherein the EN-DC capability on at least one of the first SIM and the second SIM is changed based on an event associated with one of the first SIM and the second SIM, and wherein the event is one of: the voice call, the data service, or a video call.

* * * * *